United States Patent
Usami

(10) Patent No.: US 10,409,212 B2
(45) Date of Patent: Sep. 10, 2019

(54) POWER SUPPLY CIRCUIT AND IMAGE FORMING APPARATUS

(71) Applicant: TOSHIBA TEC KABUSHIKI KAISHA, Tokyo (JP)

(72) Inventor: Yutaka Usami, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/943,658

(22) Filed: Apr. 2, 2018

(65) Prior Publication Data
US 2018/0364628 A1 Dec. 20, 2018

(30) Foreign Application Priority Data
Jun. 20, 2017 (JP) .................. 2017-120608

(51) Int. Cl.
G03G 15/00 (2006.01)
G03G 15/20 (2006.01)
H02J 7/00 (2006.01)
H02M 1/08 (2006.01)
H02M 3/158 (2006.01)
H02M 3/335 (2006.01)
(Continued)

(52) U.S. Cl.
CPC ......... *G03G 15/80* (2013.01); *G03G 15/2039* (2013.01); *G03G 15/5004* (2013.01); *H02J 7/0068* (2013.01); *H02M 1/08* (2013.01); *H02M 3/1588* (2013.01); *H02M 3/33523* (2013.01); *G03G 2215/00983* (2013.01); *H02M 3/158* (2013.01); *H02M 3/33507* (2013.01); *H02M 7/538* (2013.01); *H02M 2001/0009* (2013.01)

(58) Field of Classification Search
CPC ........... G03G 15/2039; G03G 15/5004; G03G 15/80; G03G 2215/00983; H02J 7/00; H02J 7/0068; H02M 1/08; H02M 3/1588; H02M 3/33523; H02M 3/33507; H02M 3/158; H02M 2001/0009; H02M 7/538
See application file for complete search history.

(56) References Cited

U.S. PATENT DOCUMENTS

| 5,690,849 A | 11/1997 | Devilbiss et al. |
| 2012/0074786 A1 | 3/2012 | Johnson, Jr. et al. |
| 2015/0220044 A1 | 8/2015 | Tatsumoto et al. |

(Continued)

FOREIGN PATENT DOCUMENTS

JP 2015-023603 A 2/2015

OTHER PUBLICATIONS

Office Action dated Nov. 30, 2018 in U.S. Appl. No. 15/942,511 (PG Publication No. US 2018/0364632 A1), 22 pages.

*Primary Examiner* — Sophia S Chen
(74) *Attorney, Agent, or Firm* — Kim & Stewart LLP

(57) ABSTRACT

A power supply circuit includes a thermoelectric conversion element configured to generate electric power when it is differentially heated, an adjustable current circuit configured to draw a current from the thermoelectric conversion element and resultantly output a constant current over a period of time, a voltage conversion circuit configured to output a voltage based on the current output by the adjustable current circuit, and a control circuit configured to control the adjustable current circuit to change a target value of the constant current output by the adjustable current circuit.

14 Claims, 12 Drawing Sheets

(51) Int. Cl.
 *H02M 1/00* (2006.01)
 *H02M 7/538* (2007.01)

(56) References Cited

U.S. PATENT DOCUMENTS

| | | | |
|---|---|---|---|
| 2015/0261152 A1* | 9/2015 | Saiki | H01L 35/32 136/203 |
| 2015/0311731 A1* | 10/2015 | Tatsumoto | G03G 15/80 320/107 |
| 2016/0293824 A1* | 10/2016 | Ueno | H01L 35/32 |
| 2017/0033706 A1 | 2/2017 | Usami | |
| 2017/0187213 A1 | 6/2017 | Xu et al. | |

\* cited by examiner

FIG. 8
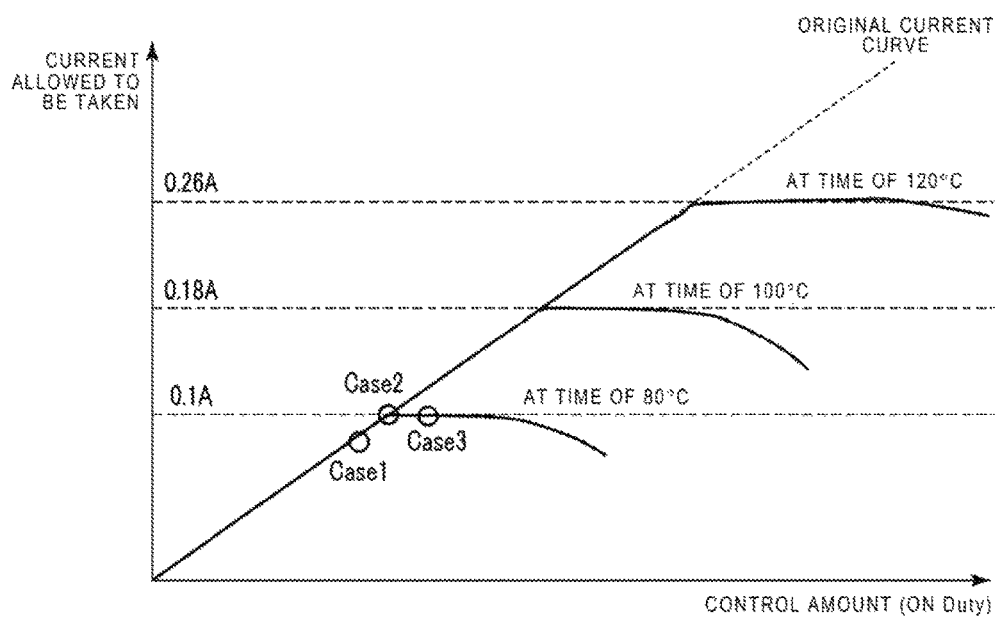
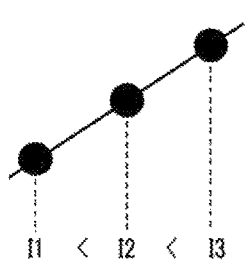
FIG. 9A
Case1
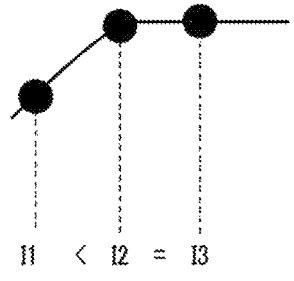
FIG. 9B
Case2
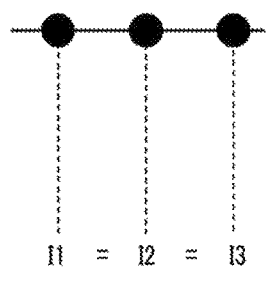
FIG. 9C
Case3

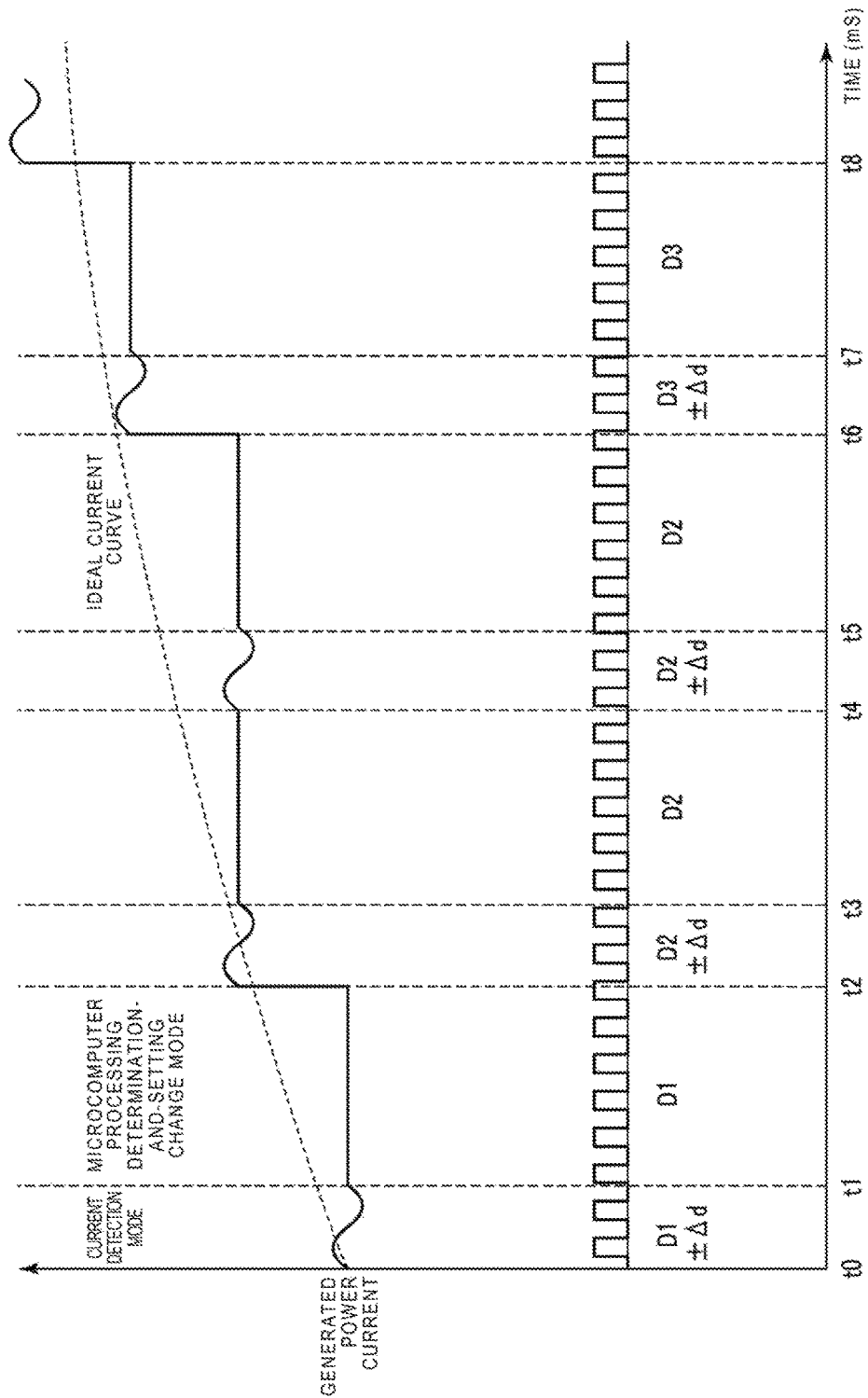

POWER SUPPLY CIRCUIT AND IMAGE FORMING APPARATUS

CROSS-REFERENCE TO RELATED APPLICATION

This application is based upon and claims the benefit of priority from Japanese Patent Application No. 2017-120608, filed Jun. 20, 2017, the entire contents of which are incorporated herein by reference.

FIELD

Embodiments described herein relate generally to a power supply circuit and an image forming apparatus.

BACKGROUND

In the related art, there is a technology in which heat is generated from a heating element such as a heater using electric power from an AC power supply, and processing of a component, melting of a wax, and the like are performed using the generated heat of the heating element. For example, in an image forming apparatus that performs printing in accordance with a print request, a dye material (toner) is melted so as to be fixed on a print medium by a fixing roller which is heated by a high temperature heating element. In this manner, the image forming apparatus forms an image on the print medium.

High electric power of about thousands of watts is required for heating the heating element to a high temperature to melt the toner. In addition, the heat of the heating element after the processing is ended is generally discharged into the air. A charging control device which includes a thermoelectric conversion element and a storage battery can be provided. The thermoelectric conversion element generates electric power when heated. A storage battery stores the electric power generated by the thermoelectric conversion element.

In such a charging control device, driving a DC/DC converter is required for drawing electric power from the thermoelectric conversion element. The current which can be drawn from the thermoelectric conversion element is limited depending on the characteristics and a temperature difference across the thermoelectric conversion element. Thus, a situation in which electric power to be drawn from the thermoelectric conversion element is not increased, even though a control of increasing an output of the DC/DC converter is performed, may occur. In such a case, there is a problem in that efficiency of drawing electric power from the thermoelectric conversion element is decreased.

DESCRIPTION OF THE DRAWINGS

FIG. 8 is a diagram illustrating an example of characteristics of a thermoelectric conversion element.

FIGS. 9A to 9C are diagrams illustrating examples of a change of the generated power current when ON duty cycle of the A-CC driving pulse is switched.

FIG. 10 is a diagram illustrating a relationship between the generated power current and the ON duty cycle.

DETAILED DESCRIPTION

Embodiments provide a power supply circuit having high efficiency and an image forming apparatus.

According to an embodiment, a power supply circuit includes a thermoelectric conversion element configured to generate electric power when it is differentially heated, an adjustable current circuit configured to draw a current from the thermoelectric conversion element and resultantly output a constant current over a period of time, a voltage conversion circuit configured to output a voltage based on the current output by the adjustable current circuit, and a control circuit configured to control the adjustable current circuit to change a target value of the constant current output by the adjustable current circuit.

Hereinafter, an embodiment will be described with reference to the drawings.

Figure 1A:
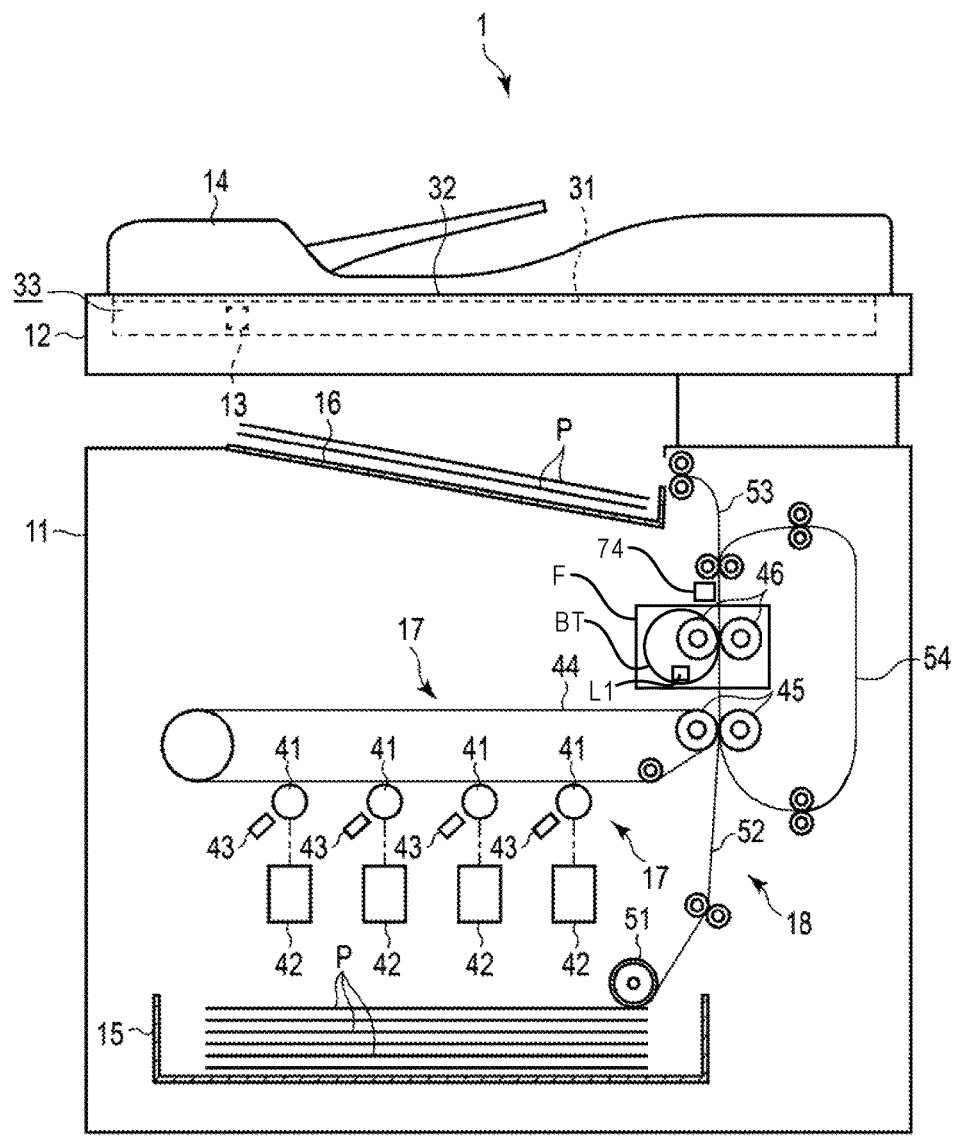
FIG. 1A is a diagram illustrating an example of a configuration of an image forming apparatus according to an embodiment.

FIG. 1A is a diagram illustrating a configuration example of an image forming apparatus 1 according to an embodiment.

The image forming apparatus 1 is, for example, a multi-function peripheral (MFP) that performs various types of processing such as image forming while transporting a recording medium such as a print medium therein. The image forming apparatus 1 charges a photoconductive drum and irradiates the photoconductive drum with light in accordance with image data (print data) for printing, so as to form a latent image (electrostatic latent image) on the photoconductive drum. The image forming apparatus 1 causes a toner (developer) to adhere to the latent image formed on the photoconductive drum, and transfers the toner which adheres to the latent image, onto a print medium, so as to form a toner image on the print medium. The image forming apparatus 1 nips the print medium on which the toner image is formed, by one of a pair of fixing rollers 46 (which will be described later herein) and a thermal fixing belt BT which is heated to a high temperature (which will be described later herein), so as to fix the adhered toner image onto the print medium.

The image forming apparatus 1 acquires an image present on a medium in a manner that imaging is performed in an image sensor by using the reflected light of light with which the medium was irradiated, and charges accumulated in the image sensor are read and the read charges are converted into a digital signal representative of the image.

The image forming apparatus 1 includes a housing 11, a document stand 12, a scanner unit 13, an automatic document feeder (ADF) 14, a paper feeding cassette 15, a paper discharge tray 16, an image forming unit 17, a transporting unit 18, a thermal fixing unit F, and a thermoelectric conversion element 74.

The housing 11 is the main body for holding the document stand 12, the scanner unit 13, the ADF 14, the paper feeding cassette 15, the paper discharge tray 16, the image forming unit 17, the transporting unit 18, the thermal fixing unit F, and the thermoelectric conversion element 74.

The document stand 12 is a part on which a medium P as an original document to be scanned is placed. The document stand 12 includes a glass plate 31 and a space 33 therein. The medium P as the original document is placed on the glass plate 31. The space 33 is positioned on a surface on an opposite side of a placement surface 32 of the glass plate 31, on which the medium P as the original document is placed.

The scanner unit 13 acquires an image from the medium P in accordance with a control signal of a main controller 19 (which will be described later herein). The scanner unit 13 is disposed in the space 33 on the document stand 12 of the placement surface 32, which is an opposite side of the placement surface 32. The scanner unit 13 includes an image sensor, an optical element, an illumination equipment, and the like.

The image sensor is an imaging element in which pixels, in which light is converted into an electric signal (image signal), are arranged along a generally straight line. The image sensor is configured, for example, by a charge coupled device (CCD), a complementary metal oxide semiconductor (CMOS), or other imaging elements.

The optical element forms an image in the pixels of the image sensor using light received within a predetermined reading range. The reading range of the optical element is a line-like region on the placement surface 32 of the document stand 12. The optical element forms an image in the pixels of the image sensor with light which is reflected by the medium P placed on the placement surface 32 of the document stand 12 and transmitted through the glass plate 31.

Illumination equipment irradiates the medium P with light. The illumination equipment includes a light source and a light guide for irradiating the medium P with light from the light source. The illumination equipment irradiates a region including the reading region of the optical element, with light emitted from the light source. The irradiation is performed by the light guide.

When the medium P is placed on the placement surface 32 of the document stand 12, the scanner unit 13 is driven by a driving mechanism (not illustrated) in a sub-scanning direction which is perpendicular to an arrangement direction (main scanning direction) of the pixels in the image sensor and is parallel to the placement surface 32. The scanner unit 13 continuously acquires an image for each line by the image sensor, while being driven in the sub-scanning direction. Thus, the scanner unit 13 acquires image data (original document image data) of the entirety of the medium P placed on the placement surface 32 of the document stand 12.

The ADF 14 is a mechanism for transporting the medium P. The ADF 14 is provided on the document stand 12 to be freely closed or opened. The ADF 14 takes a medium P disposed on a tray, in accordance with the control of the main controller 19 (which will be described later). The ADF 14 transports the taken medium P to a scanning location on the glass plate 31 of the document stand 12.

If the medium P is transported by the ADF 14, the scanner unit 13 is driven to a position facing a position of the glass plate 31 at which the medium P is located by the ADF 14. The scanner unit 13 continuously acquires an image from the medium P transported by the ADF 14, for each line by the image sensor, and thus acquires image data (original document image data) of the entirety of the medium P transported by the ADF 14.

The paper feeding cassette 15 is a cassette for accommodating a print medium P to be printed upon. The paper feeding cassette 15 is configured so as to allow for a supply of the print medium P to be located therein from the outside of the housing 11. For example, the paper feeding cassette 15 is configured so as to be allowed to be withdrawn from the housing 11.

The paper discharge tray 16 is a tray for supporting the print medium P discharged from the image forming apparatus 1.

The image forming unit 17 is a printer that forms an image on a print medium P under the control of the main controller 19 (which will be described later herein). For example, the image forming unit 17 charges the drum, and forms a latent image depending on image data (print data) for printing, on the charged drum. The image forming unit 17 causes a toner to adhere to the latent image formed on the drum and transfers the toner adhering to the latent image, onto the print medium P. Thus, the image forming unit 17 forms an image on the print medium P. The image forming unit 17 includes, for example, a drum 41, an exposure machine 42, a developing machine 43, a transfer belt 44, a pair of transfer rollers 45, and the thermal fixing unit F, as illustrated in FIG. 1A.

The drum 41 is a photoconductive drum which is formed to have a cylindrical shape. The drum 41 is provided to come into contact with the transfer belt 44. The surface of the drum 41 is uniformly charged by a charging charger (not illustrated). The drum 41 rotates at a constant speed by a driving mechanism (not illustrated).

The exposure machine 42 forms an electrostatic latent image on the charged drum 41. The exposure machine 42 irradiates the surface of the drum 41 with a laser beam by a light emitting element or the like in accordance with the print data, and thus forms an electrostatic latent image on the surface of the drum 41. The exposure machine 42 includes a light emitting unit and an optical element.

The light emitting unit has a configuration in which light emitting elements for emitting light in accordance with an electric signal (image signal) are arranged in line. Each of the light emitting elements in the light emitting unit emits light having a wavelength which allows a latent image to be formed on the charged drum 41. The light emitted from the light emitting unit forms an image on the surface of the drum 41 by the optical element.

The developing machine 43 causes the toner (developer) to adhere to the electrostatic latent image formed on the drum 41. Thus, the developing machine 43 forms a toner image on the surface of the drum 41.

The drum 41, the exposure machine 42, and the developing machine 43 of the image forming unit 17 are provided for each of colors of cyan, magenta, yellow, and black, for example. In this case, each of a plurality of developing machines 43 holds a different color toner.

The transfer belt 44 is a member that receives a toner image formed on the surface of the drum 41 and causes the toner image to be transferred to a print medium P. The transfer belt 44 is moved by the rotation of the roller. The transfer belt 44 receives the toner image formed on the drum 41 at a position in contact with the drum 41, and moves the received toner image to the pair of transfer rollers 45.

The pair of transfer rollers 45 is configured to interpose the transfer belt 44 and a print medium P between them. The pair of transfer rollers 45 cause the toner image on the transfer belt 44 to be transferred to the print medium P.

The thermal fixing unit F includes the pair of fixing rollers 46, a thermal fixing belt BT which is formed in an endless shape, a first inductor L1, a heater control circuit 73. In this example, one of the pair of fixing rollers 46 and the first inductor L1 are arranged within the perimeter of the thermal fixing belt BT as shown in FIG. 1A. The outer peripheral surface of the other of the pair of fixing rollers 46 comes into contact with the outer peripheral surface of the thermal fixing belt BT and presses the thermal fixing belt BT toward the one of the pair of fixing rollers 46. The print medium P on which a toner image is transferred passes between the outer peripheral surface of the thermal fixing belt BT and the outer peripheral surface of the other of the pair of the fixing rollers 46. The thermal fixing belt BT is heated by induction heating using the first inductor L1 under control of the heater control circuit 73. The outer peripheral surface of the thermal fixing belt BT and the outer peripheral surface of the other of the pair of the fixing rollers 46 press on the print medium P nipped therebetween in the heated state, and thus fixes the transferred toner image onto the print medium P. That is, the thermal fixing unit F fixes the toner image, and thus causes a fixed image to be formed on the print medium P under control of the heater control circuit 73.

The transporting unit 18 transports a print medium P. The transporting unit 18 includes a transporting path and a sensor. The transporting path is configured by a plurality of guides and a plurality of rollers. The sensor detects a transportation position of a print medium P on the transporting path. The transporting path is a path through which a print medium P is transported. Transporting rollers, which are arranged along the transporting path are rotated by a motor which operates under the control of the main controller 19 (which will be described later). Thus, the print medium P is transported along the transporting path. Some of the plurality of guides are moved by a motor which operates under the control of the main controller 19 (which will be described later), and thus causes the transporting path for transporting a print medium P to be switched.

For example, as illustrated in FIG. 1A, the transporting unit 18 includes a feeding roller 51, a fed paper transporting path 52, a paper discharging path 53, and a reversal transporting path 54.

The feeding roller 51 picks up an upper most print medium P among print media stacked in the paper feeding cassette 15 and feeds it to the fed paper transporting path 52.

The fed paper transporting path 52 is a transporting path for transporting the print medium P which is taken out from the paper feeding cassette 15 by the feeding roller 51 to the image forming unit 17.

The paper discharging path 53 is a transporting path for discharging a print medium P on which an image is formed by the image forming unit 17, from the housing 11. The print medium P discharged on the paper discharging path 53 is discharged to the paper discharge tray 16.

The reversal transporting path 54 is a transporting path for supplying a print medium P to the image forming unit 17 again in a state where, for example, the front and the back, or the front and the rear of the print medium P on which an image is formed by the image forming unit 17 are reversed.

Figure 1B:
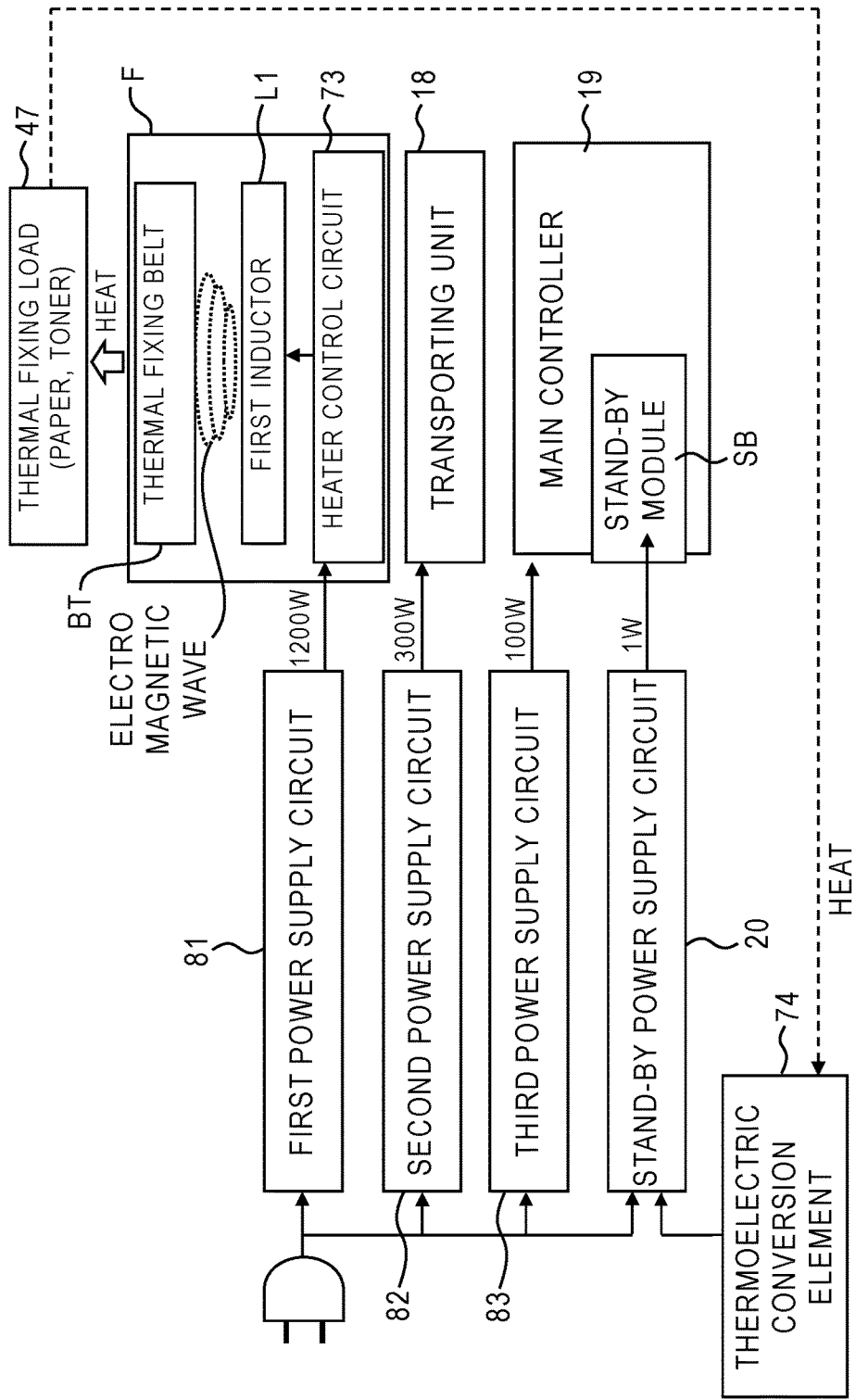
FIG. 1B is a diagram illustrating an example of an overview of an entire circuit configuration according to the embodiment.

FIG. 1B is a schematic diagram of an entire circuit configuration of the image forming apparatus 1 according to the embodiment. As shown in FIG. 1B, the image forming apparatus 1 includes, for example, a first power supply circuit 81, a second power supply circuit 82, a third power supply circuit 83, a stand-by power supply circuit 20, the heater control circuit 73, the main controller 19, and the thermoelectric conversion element 74.

The thermoelectric conversion element 74 is provided at a position on a downstream side and in the vicinity of the thermal fixing unit F in the paper transporting direction of the paper discharging path 53. The thermoelectric conversion element 74 generates electric power upon being heated. The thermoelectric conversion element 74 is, for example, thermocouple in which two different kinds of metals or semiconductors are bonded to each other. The thermoelectric conversion element 74 is heated by heat of a thermal fixing load 47 such as a paper, toner and heated air around the paper, passing through the thermoelectric conversion element 74, after being heated by the thermal fixing unit F and heat transmitted through the air from the thermal fixing unit F, and resultantly generates electric power. That is, the thermoelectric conversion element 74 generates electric power from the heat.

The first power supply circuit 81 is configured to receive a power supply from an AC power supply E and supply power by 1200 W to the heater control unit 73, for example.

The second power supply circuit 82 is configured to receive a power supply from the AC power supply E and supply power by 300 W to the transport unit 18, for example.

The third power supply circuit 83 is configured to receive a power supply from the AC power supply E and supply power by 100 W to the main controller 19, for example.

In the main controller 19, a stand-by module SB is provided and controls power supply to the main controller 19 during the image forming apparatus is in a sleep mode in which the supply of the electric power to the heater control circuit 73 and a transport unit 18 is suspended for energy saving.

The stand-by power supply circuit 20 is configured to receive a power supply from either one of the AC power supply E and the thermoelectric conversion element 74 and supply power by 1 W to the stand-by module SB in the main controller 19, for example.

The heater control circuit 73 is configured to control the induction heating by the thermal fixing unit F in collaboration with the main controller 19.

In addition, the main controller 19 entirely controls the image forming apparatus 1. For example, the main controller 19 entirely performs control of the scanner unit 13, the ADF 14, the image forming unit 17, the transporting unit 18, and an operation input unit (not shown) of the image forming apparatus 1.

The main controller 19 includes, for example, a CPU, a ROM, a RAM, and a nonvolatile memory.

The CPU is a computing element (for example, a processor) that performs computing processing. The CPU performs various types of processing based on data such as a program, which is stored in the ROM. The CPU functions as a control unit which can perform various operations, by executing a program stored in the ROM. The CPU inputs print data for forming an image on a print medium P to the image forming unit 17. The CPU inputs a transporting control signal for an instruction to transport a print medium P, to the transporting unit 18.

The ROM is a nonvolatile read only memory. The ROM stores a program and data used in the program, for example.

The RAM is a volatile memory functioning as a working memory which can be read from and written to. The RAM temporarily stores data during the processing of the CPU. The RAM temporarily stores a program executed by the CPU.

The nonvolatile memory is a storage medium (storage unit) which is capable of storing various types of information. The nonvolatile memory stores a program and data used in the program, for example. As the nonvolatile memory, for example, a solid state drive (SSD), a hard disk drive (HDD), or another storage device is provided. Instead of the nonvolatile memory, a memory IF such as a card slot into which a storage medium such as a memory card can be inserted may be provided.

Figure 2:
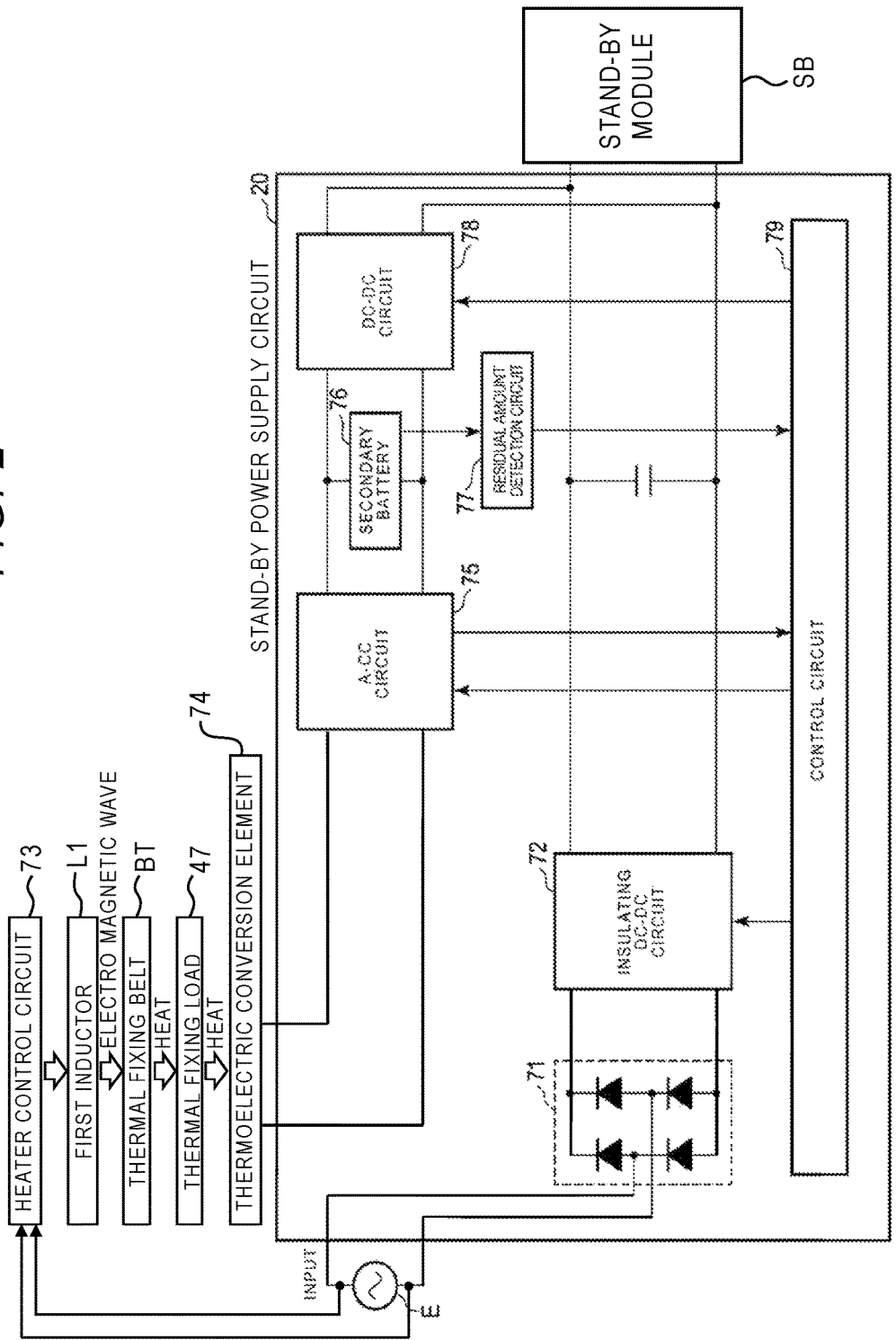
FIG. 2 is a diagram illustrating an example of a configuration of a power supply circuit according to the embodiment.

The stand-by power supply circuit 20 is configured to supply electric power to the stand-by module SB. FIG. 2 is a circuit diagram illustrating a configuration of the stand-by power supply circuit 20. The stand-by power supply circuit 20 receives AC power supplied from the external AC power supply E. The stand-by power supply circuit 20 converts the supplied AC power into electric power having a voltage in accordance with a stand-by module SB, and supplies the electric power obtained by the conversion to the stand-by module SB.

The stand-by power supply circuit 20 includes a full-wave rectifying circuit 71, an insulating DC-DC circuit 72, an adjustable constant current (A-CC) circuit 75, a secondary battery 76, a residual amount detection circuit 77, a DC-DC circuit 78, and a control circuit 79.

The full-wave rectifying circuit 71 is a circuit configured to perform full-wave rectification of the AC power input from the AC power supply E and to supply a ripple voltage to a circuit at a subsequent stage of the stand-by power supply circuit 20. For example, the full-wave rectifying circuit 71 is configured by a plurality of diodes and includes a rectifying bridge configured to receive the input AC power.

The insulating DC-DC circuit 72 is a converter that supplies DC electric power to the stand-by module SB using the ripple voltage from the full-wave rectifying circuit 71.

Figure 3:
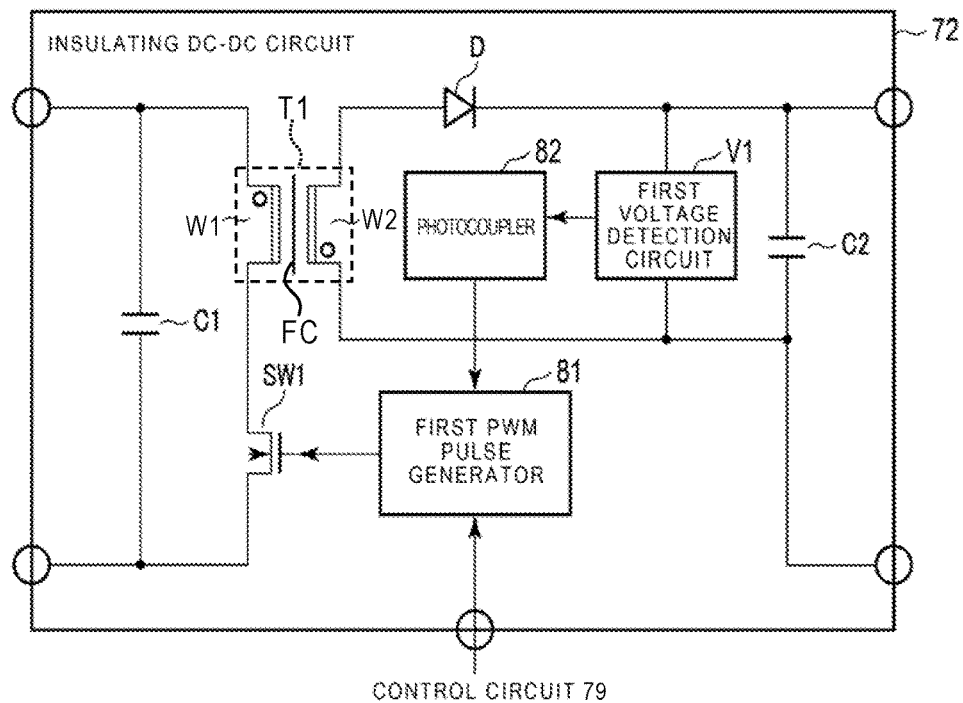
FIG. 3 is a diagram illustrating an example of a configuration of an insulating DC-DC circuit according to the embodiment.

FIG. 3 is a diagram illustrating a configuration example of the insulating DC-DC circuit 72. The insulating DC-DC circuit 72 is, for example, a flyback converter. The insulating DC-DC circuit 72 supplies electric power to the secondary side thereof which is insulated from the primary side thereof, to which electric power is supplied from the power source. The insulating DC-DC circuit 72 includes a first capacitor C1, a transformer T1, a first switching element SW1, a rectifying diode D, a second capacitor C2, a first pulse width modulation (PWM) pulse generator 81, a first voltage detection circuit V1, and a photocoupler 82. The transformer T1 includes a primary winding W1, a secondary winding W2 and a ferrite core FC.

The first capacitor C1 smooths the input ripple voltage. The primary winding W1 of the transformer T1 functions as a primary transformer winding. The secondary winding W2 of the transformer T1 is electromagnetically coupled with the primary winding W1 and functions as a secondary transformer winding. The first switching element SW1 performs switching between a conduction state (ON or closed) and a non-conduction state (OFF or open) in accordance with a pulse signal input from the first PWM pulse generator 81, and thus causes the current flowing in the primary winding W1 to switch between ON and OFF. The rectifying diode D rectifies the current generated in the secondary winding W2. The second capacitor C2 smooths the voltage generated in the secondary winding W2.

The first PWM pulse generator 81 inputs a pulse signal to the first switching element SW1, under the control of the control circuit 79. Thus, the first PWM pulse generator 81 performs switching of the first switching element SW1 between ON and OFF states. The first voltage detection circuit V1 detects the voltage of the second capacitor C2. The photocoupler 82 applies feedback to the first PWM pulse generator 81 in accordance with a detection result of the first voltage detection circuit V1.

In the above configuration, if the first switching element SW1 turns ON, a current flows in the primary winding W1 and electric energy is converted into magnetic energy. At this time, a reverse voltage is applied to the rectifying diode D on the secondary side of the circuit, and thus electric power is not delivered to the secondary side of the circuit. Then, if the first switching element SW1 turns OFF, a current flows into the second capacitor C2 via the rectifying diode D by accumulated magnetic energy, and electric power is stored in the second capacitor C2. Electric power stored in the second capacitor C2 is supplied to the stand-by module SB at the subsequent stage of the stand-by power supply circuit 20, as DC electric power.

The electric power delivered to the secondary side is determined based on the current flowing in the primary winding W1. That is, the electric power delivered to the secondary side is determined by the time period when the first switching element SW1 is in an ON state. The first PWM pulse generator 81 increases the current flowing in the primary winding W1 and increases the electric power delivered to the secondary side by widening the pulse width, i.e., the duration of the first pulse, to thereby increase the "ON" duty cycle. The first voltage detection circuit V1 and the photocoupler 82 perform feedback of an output voltage to the first PWM pulse generator 81. The first PWM pulse generator 81 controls the pulse width of the pulse signal for driving the first switching element SW1, based on feedback from the first voltage detection circuit V1 and the photocoupler 82, and thus holds the output voltage constant.

The insulating DC-DC circuit 72 may also be a DC-DC converter having an insulating function. For example, the insulating DC-DC circuit 72 may also be configured by an LLC circuit, an insulating forward circuit, and an insulating double forward circuit.

The heater control circuit 73 is connected to the AC power supply E. The heater control circuit 73 is a circuit configured to generate an electromagnetic wave using AC power from the AC power supply E and to induce a current in the first inductor L1 and thereby heat the thermal fixing belt BT by induction heating.

Figure 4:
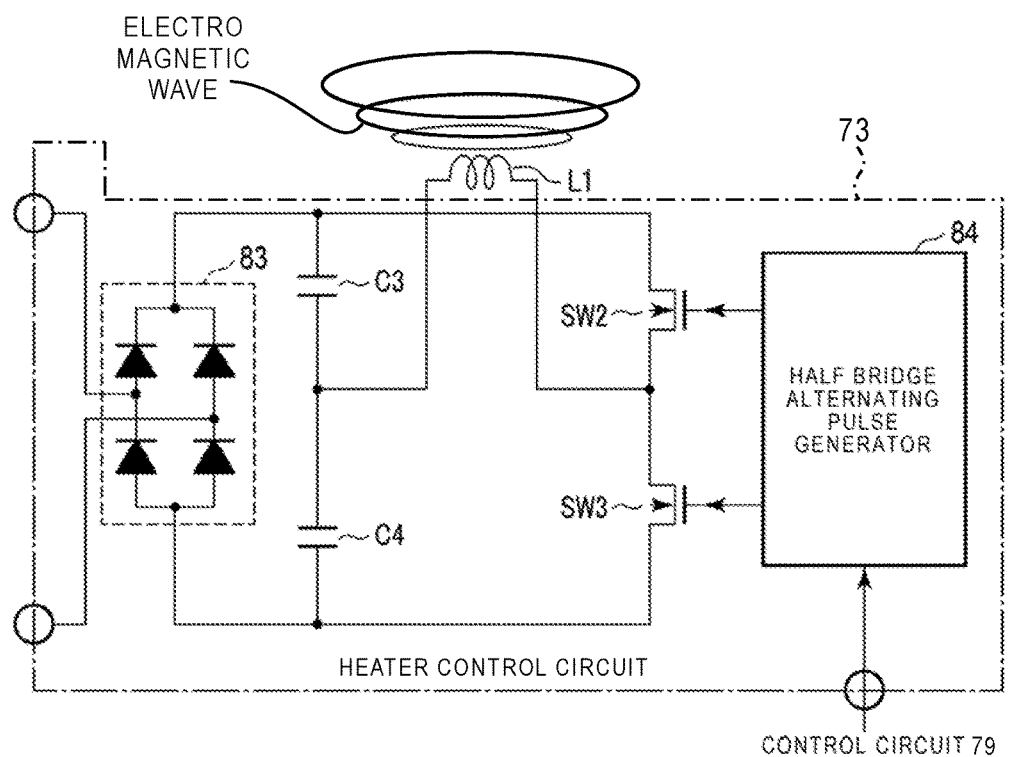
FIG. 4 is a diagram illustrating an example of a configuration of a heater control circuit according to the embodiment.

FIG. 4 is a diagram illustrating a configuration example of the heater control circuit 73. The heater control circuit 73 is, for example, a half bridge circuit. The heater control circuit 73 includes a full-wave rectifying circuit 83, a third capacitor C3, a fourth capacitor C4, a second switching element SW2, a third switching element SW3, the first inductor L1, and a half bridge alternating pulse generator 84.

The full-wave rectifying circuit 83 is a circuit configured to perform full-wave rectification of the AC power input from the AC power supply E and to supply a ripple voltage to a circuit at the subsequent stage. For example, the full-wave rectifying circuit 83 is configured by a plurality of diodes and includes a rectifying bridge configured to receive the input AC power.

The third capacitor C3 and the fourth capacitor C4 are connected in series to a DC terminal of the full-wave rectifying circuit 83. The second switching element SW2 and the third switching element SW3 are connected to the DC terminal of the full-wave rectifying circuit 83 so as to be in parallel with the series connection of the third capacitor C3 and the fourth capacitor C4. The first inductor L1 is connected between a connection point of the second switching element SW2 and the third switching element SW3 and a connection point of the third capacitor C3 and the fourth capacitor C4.

The half bridge alternating pulse generator 84 inputs a pulse signal to the second switching element SW2 and inputs a pulse signal having a logical value reversed to that of the pulse signal input to the second switching element SW2, to the third switching element SW3 under the control of the control circuit 79. Thus, the half bridge alternating pulse generator 84 performs switching of the second switching element SW2 and the third switching element SW3 between the conduction state (ON) and the non-conduction state (OFF).

In the above configuration, the second switching element SW2 and the third switching element SW3 alternately turn ON and OFF. Thus, electric power of a DC voltage supplied from the full-wave rectifying circuit 83 is converted into high-frequency AC power. The heater control circuit 73 performs induction heating using the high-frequency AC power. In induction heating, an eddy-current is generated in a conductor of the thermal fixing belt BT, and heat is generated by virtue of the resistance of the conductor in the thermal fixing belt BT. Thus, the heater control circuit 73 causes the first inductor L1 to generate the electromagnetic field and heats the thermal fixing belt BT using the generated electromagnetic field.

The half bridge alternating pulse generator 84 generates a square wave (pulse signal) corresponding to 50% of the pulses of a predetermined frequency, by using a timer, a CR time constant, and the like. The half bridge alternating pulse generator 84 inputs the generated pulse signal to a gate of one switching element and inputs a pulse signal obtained by reversing a logical value, to a gate of the other switching element. The half bridge alternating pulse generator 84 provides a dead time when a pulse signal for OFF is input to the two switching elements, so as to cause the two switching elements not to simultaneously turn ON.

The half bridge alternating pulse generator 84 changes a frequency generated by the timer, under the control of the control circuit 79. If the frequency (transmission frequency) generated by the timer is increased, a high-frequency current flowing in the first inductor L1 is decreased and the quantity of heat generated in the thermal fixing belt BT is decreased. If the frequency (transmission frequency) generated by the timer is decreased, the high-frequency current flowing in the first inductor L1 is increased and the quantity of heat generated in the thermal fixing belt BT is increased. That is, the half bridge alternating pulse generator 84 controls heat generation of the thermal fixing belt BT under the control of the control circuit 79.

The heater control circuit 73 is configured to be capable of heating the thermal fixing belt BT. For example, the heater control circuit 73 may also be configured by a full bridge inverter, a quasi-E class inverter, and a push-pull inverter.

The A-CC circuit 75 draws electric power generated in the thermoelectric conversion element 74. The A-CC circuit 75 is a variable constant current circuit configured to draw a constant current having a value in accordance with the control of the control circuit 79, from the thermoelectric conversion element 74.

Figure 5:
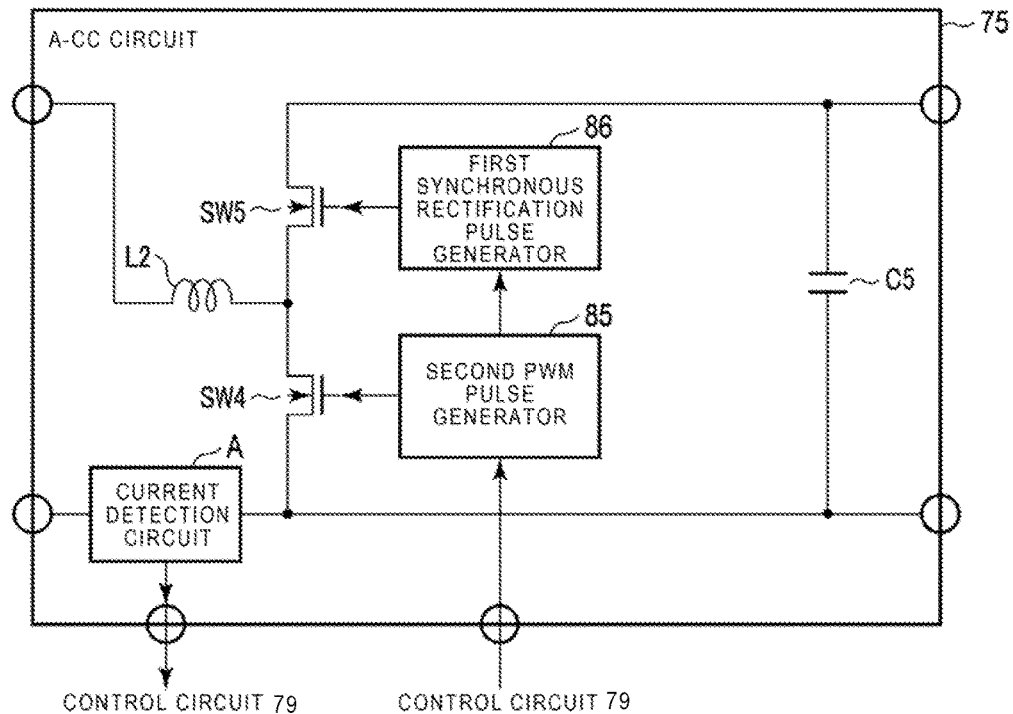
FIG. 5 is a diagram illustrating an example of a configuration of an A-CC circuit according to the embodiment.

FIG. 5 is a diagram illustrating a configuration example of the A-CC circuit 75. The A-CC circuit 75 includes a second inductor L2, a fourth switching element SW4, a fifth switching element SW5, a fifth capacitor C5, a second PWM pulse generator 85, a first synchronous rectification pulse generator 86, and a current detection circuit A. In the A-CC circuit 75, the second PWM pulse generator 85 generates a pulse signal for a basic switching control of the fourth switching element SW4 and the first synchronous rectification pulse generator 86 generates a pulse signal based on the pulse signal generated by the second PWM pulse generator 85.

The fourth switching element SW4 and the fifth switching element SW5 are connected in series between a pair of output terminals. The second inductor is connected between a connection point of the fourth switching element SW4 and the fifth switching element SW5, and one of a pair of input terminals. The fifth capacitor C5 is connected in parallel with a series connection of the fourth switching element SW4 and the fifth switching element SW5, when viewed from the pair of output terminals.

The second PWM pulse generator 85 inputs a pulse signal to the fourth switching element SW4 under the control of the control circuit 79. Thus, the second PWM pulse generator 85 performs switching of the fourth switching element SW4 between the conduction state (ON) and the non-conduction state (OFF).

The first synchronous rectification pulse generator 86 inputs a pulse signal to the fifth switching element SW5 in accordance with a signal supplied from the second PWM pulse generator 85. Thus, the first synchronous rectification pulse generator 86 switches the fifth switching element SW5 between the conduction state (ON) and the conduction state (OFF) through a body diode. The fifth switching element SW5 normally causes a current to intermittently flow in a reverse direction from its source toward its drain. Thus, the fifth switching element SW5 is in a state where a current flows via the body diode, not in the OFF state. A circuit operation is established by causing a current to flow in the body diode, but a 0.7 V loss occurs which is the forward voltage of the body diode. Therefore, if the fifth switching element SW5 is caused to be in the ON state so as to allow conduction without current passing through the body diode, it is possible to reduce loss in the fifth switching element SW5. This is generally referred to as synchronous rectification control.

The second PWM pulse generator 85 supplies a signal to the first synchronous rectification pulse generator 86 such that the first synchronous rectification pulse generator 86 inputs a pulse signal having a logical value reversed to that of the pulse signal input to the fourth switching element SW4, to the fifth switching element SW5. Thus, the second PWM pulse generator 85 causes the fourth switching element SW4 and the fifth switching element SW5 to alternately turn ON and OFF, i.e., allow current to pass therethrough in the ON state, and prevent current passing therethrough during the OFF state. The second PWM pulse generator 85 provides a dead time when all of the fourth switching element SW4 and the fifth switching element SW5 are in the OFF state, in the pulse signal so as to cause the fourth switching element SW4 and the fifth switching element SW5 not to simultaneously turn ON.

The current detection circuit A is connected in series with the second inductor L2 and the fourth switching element SW4, at a location between the pair of the input terminals.

The current detection circuit A detects a current value of a current generated by electric power which is generated by the thermoelectric conversion element 74.

In the above-described configuration, if the fourth switching element SW4 is in the ON state, a current flows along the path of one input terminal, the second inductor L2, the fourth switching element SW4, the current detection circuit A, and the other input terminal. The current in this path causes magnetic energy to be stored in the second inductor.

Then, if the fourth switching element SW4 turns OFF and the fifth switching element turns ON in a state where magnetic energy is stored in the second inductor, a current flows along the path of the second inductor L2, the fifth capacitor C5, and the current detection circuit A. The current in this path causes magnetic energy in the second inductor L2 to be converted into charge energy in the fifth capacitor C5. The charge energy stored in the fifth capacitor C5 is charged in the secondary battery 76.

When the fourth switching element SW4 is in the ON state, the current detection circuit A detects a value of a current (generated power current) flowing through, in the order of, the one input terminal, the second inductor L2, the fourth switching element SW4, and the other input terminal. The current detection circuit A supplies the detection result to the control circuit 79. When the fourth switching element SW4 is in the OFF state, the current detection circuit A detects a value of a current (generated power current) flowing through in the order of the one input terminal, the second inductor L2, the fifth switching element SW5, the fifth capacitor C5, and the other input terminal. The current detection circuit A supplies the detection result to the control circuit 79. The control circuit 79 supplies a control signal to the second PWM pulse generator 85 in accordance with the detection result from the current detection circuit A.

The second PWM pulse generator 85 adjusts the pulse width of a pulse signal input to the fourth switching element SW4, based on the control signal supplied from the control circuit 79. Thus, it is possible to perform constant current control to cause a constant current value selected by the control circuit 79 to flow. That is, the second PWM pulse generator 85 adjusts the pulse width of a pulse signal input to the fourth switching element SW4 such that a constant current having a target value in accordance with the control signal supplied from the control circuit 79 flows.

The secondary battery 76 is a storage battery that stores electric power supplied from the A-CC circuit 75 and supplies the stored electric power to other circuits. For example, the secondary battery 76 supplies electric power to the DC-DC circuit 78 at a subsequent stage of the control circuit 20.

The residual amount detection circuit 77 detects the residual amount of the electric power stored in the secondary battery 76 and supplies the detection result to the control circuit 79.

The DC-DC circuit 78 is a converter that converts a voltage of electric power supplied from the secondary battery 76 into a voltage required by the stand-by module SB and supplies the DC electric power to the stand-by module SB.

Figure 6:
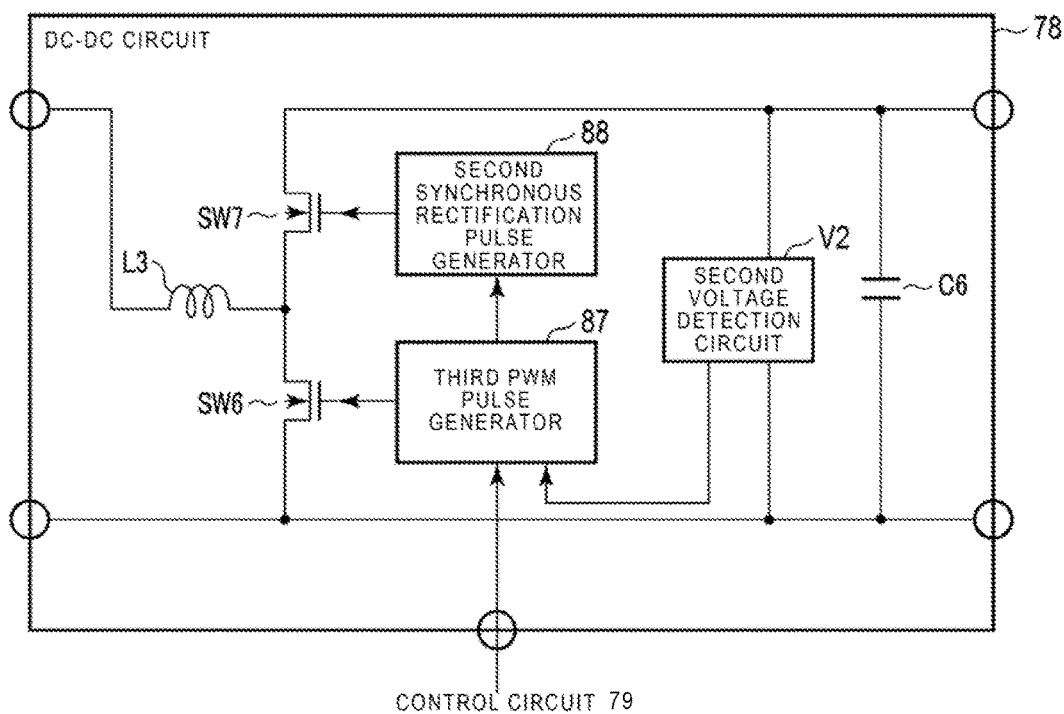
FIG. 6 is a diagram illustrating an example of a configuration of a DC-DC circuit according to the embodiment.

FIG. 6 is a diagram illustrating a configuration example of the DC-DC circuit 78. The DC-DC circuit 78 includes a third inductor L3, a sixth switching element SW6, a seventh switching element SW7, a sixth capacitor C6, a third PWM pulse generator 87, a second synchronous rectification pulse generator 88, and a second voltage detection circuit V2.

The sixth switching element SW6 and the seventh switching element SW7 are connected in series between the pair of output terminals. The third inductor is connected at a location between a connection point of the sixth switching element SW6 and the seventh switching element SW7 and one of the pair of the input terminals. The sixth capacitor C6 is connected in parallel with a series connection of the sixth switching element SW6 and the seventh switching element SW7, when viewed from the pair of output terminals.

The third PWM pulse generator 87 inputs a pulse signal to the sixth switching element SW6 under the control of the control circuit 79. Thus, the third PWM pulse generator 87 switches the sixth switching element SW6 between the conduction state (ON) and the non-conduction state (OFF).

The second synchronous rectification pulse generator 88 inputs a pulse signal to the sixth switching element SW6 in accordance with a signal supplied from the third PWM pulse generator 87. Thus, the second synchronous rectification pulse generator 88 switches the seventh switching element SW7 between the conduction state (ON) and the conduction state (OFF) through a body diode.

The third PWM pulse generator 87 supplies a signal to the second synchronous rectification pulse generator 88 such that the second synchronous rectification pulse generator 88 inputs a pulse signal having a logical value reversed to that of the pulse signal input to the sixth switching element SW6, to the seventh switching element SW7. Thus, the third PWM pulse generator 87 causes the sixth switching element SW6 and the seventh switching element SW7 to alternately turn ON and OFF. The third PWM pulse generator 87 provides a dead time when all of the sixth switching element SW6 and the seventh switching element SW7 are in the OFF state in the pulse signal so as to cause the sixth switching element SW6 and the seventh switching element SW7 not to simultaneously turn ON.

The second voltage detection circuit V2 is connected in parallel with the sixth capacitor at a portion between the pair of output terminals.

In the above-described configuration, if the sixth switching element SW6 is in the ON state, a current flows in the path of one input terminal, the third inductor L3, the sixth switching element SW6, and the other input terminal. The current in this path causes magnetic energy to be stored in the third inductor.

Then, if the sixth switching element SW6 turns OFF and the seventh switching element turns ON in a state where magnetic energy is stored in the third inductor, a current flows in the path of the third inductor L3 and the sixth capacitor C6. The current in this path causes magnetic energy in the third inductor L3 to be converted into charge energy in the sixth capacitor C6. The charge energy stored in the sixth capacitor C6 is supplied to the stand-by module SB.

The second voltage detection circuit V2 detects a voltage of the sixth capacitor, and supplies the detection result to the third PWM pulse generator 87. The third PWM pulse generator 87 performs a control based on the detection result of the voltage in the second voltage detection circuit V2, such that the voltage in the sixth capacitor is equal to a voltage selected in accordance with the control of the control circuit 79. Thus, the DC-DC circuit 78 supplies DC electric power at the voltage selected in accordance with the control of the control circuit 79 to the stand-by module SB using the electric power supplied from the secondary battery 76.

The seventh switching element SW7 is, for example, an N-type MOSFET. When the N-type MOSFET is in the ON state, a current flows from the drain thereof toward the source thereof. When the N-type MOSFET is in the OFF state, the N-type MOSFET operates as a body diode in which a current flows from the source thereof toward the drain thereof. If the N-type MOSFET turns ON in this state, the N-type MOSFET operates as a switch at a threshold voltage which is lower than a voltage when the N-type MOSFET operates as the diode.

For example, when a voltage applied to the body diode of the seventh switching element SW7 is 1.5 V, conduction resistance when the seventh switching element SW7 is in the ON state is 0.01Ω, and if a current flowing at this time is 1 A, the resulting potential difference satisfies V=1 A×0.01Ω=0.01 V. That is, the voltage is lower than the voltage generated in the body diode. As a result, it is possible to decrease conduction loss. As described above, a case where a MOSFET is connected in a reverse direction and is used instead of a diode in order to decrease the conduction loss is generally referred to as synchronous rectification.

The control circuit 79 controls an operation of the insulating DC-DC circuit 72, an operation of the heater control circuit 73, an operation of the A-CC circuit 75, and an operation of the DC-DC circuit 78. Specifically, the control circuit 79 controls an output voltage of the insulating DC-DC circuit 72 by inputting a control signal to the first PWM pulse generator 81. The control circuit 79 controls the quantity of heat to be generated in the thermal fixing belt BT by the heater control circuit 73, by inputting a control signal to the half bridge alternating pulse generator 84 of the heater control circuit 73. The control circuit 79 controls a current flowing in the second inductor L2 of the A-CC circuit 75, by inputting a control signal to the second PWM pulse generator 85 of the A-CC circuit 75. The control circuit 79 controls an output voltage of the DC-DC circuit 78 by inputting a control signal to the third PWM pulse generator 87 of the DC-DC circuit 78.

Next, a control of the operation of the A-CC circuit 75 by the control circuit 79 will be described in detail.

Figure 7:
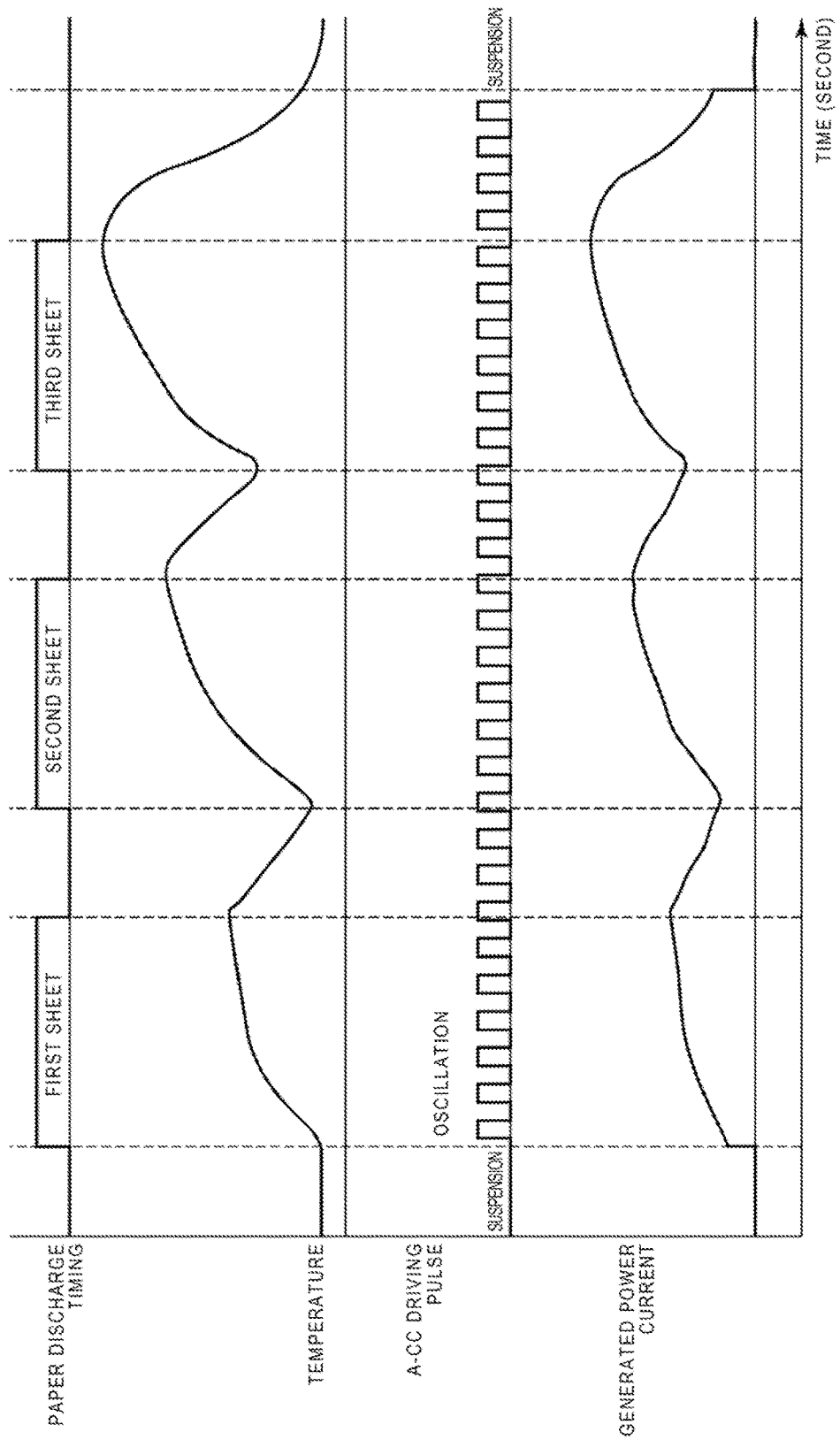
FIG. 7 is a diagram illustrating a relationship between a paper discharge timing, a temperature, an A-CC driving pulse, and a generated power current.

FIG. 7 is a diagram illustrating a relationship between a paper discharge timing, a temperature, an A-CC driving pulse, and a generated power current. The horizontal axis indicates time. Vertical axes respectively indicate the paper discharge timing, the temperature, the A-CC driving pulse, and the generated power current in that order from the top. Here, an example in which the electrophotographic image forming apparatus 1 discharges three sheets of print media after printing thereon is used.

The paper discharge timing indicates a timing when the print medium is discharged from the thermal fixing unit F in the image forming apparatus 1. A speed at which the print medium is discharged is, for example, one sheet per second. The temperature indicates a temperature detected by a temperature sensor (not illustrated) that detects the temperature of a paper, toner and heated air around the paper, passing through the temperature sensor, after being heated by the thermal fixing unit F. The A-CC driving pulse is a signal used when the second PWM pulse generator 85 in the A-CC circuit 75 controls the fourth switching element SW4. The generated power current indicates a value of a current detected by the current detection circuit A in the A-CC circuit 75.

For example, if the thermal capacity of the thermoelectric conversion element 74 is very small, a temperature difference occurs between the opposed ends of the thermoelectric conversion element 74 caused by the air which is discharged along with the print medium. The temperature difference occurring between the opposed ends of the thermoelectric conversion element 74 is increased as the print medium is passing, and is slowly decreased after the print medium passes. The temperature difference occurring between the opposed ends of the thermoelectric conversion element 74 is increased whenever the number of discharged print media is increased.

The control circuit 79 controls the A-CC driving pulse to aim at obtaining a current which is substantially proportional to the temperature difference occurring between or across the opposed ends of the thermoelectric conversion element 74, from the thermoelectric conversion element 74 as the generated power current. The control circuit 79 controls the timing for switching fourth switching element SW4 of the A-CC circuit 75 between ON and OFF, by adjusting the pulse width of the A-CC driving pulse. That is, the control circuit 79 adjusts the pulse width of the A-CC driving pulse, and thus the A-CC circuit 75 controls the current value of the generated power current from the thermoelectric conversion element 74. The control circuit 79 receives the current value of the generated power current from the A-CC circuit, and adjusts the pulse width of the A-CC driving pulse in accordance with the received current value. Thus, the control circuit 79 controls the A-CC circuit 75 to receive a current having a target or desired current value, from the thermoelectric conversion element 74.

If the temperature difference occurring between the opposed ends of the thermoelectric conversion element 74 is small, the obtained generated power current is reduced. Thus, electric power required for driving the A-CC circuit 75 may be greater than electric power that can be obtained from the thermoelectric conversion element 74. When it is not possible to expect that electric power of a predetermined quantity or greater can be generated by the thermoelectric conversion element 74, the control circuit 79 controls the A-CC circuit 75 to cause the A-CC driving pulse to indicate the OFF state. When the A-CC driving pulse indicates the OFF state, the current which flows via the body diode of the fourth switching element SW4 in the A-CC circuit 75 is also zero. As a result, the generated current is zero.

For example, when a temperature which is equal to or higher than a predetermined temperature is not detected by the temperature sensor, the control circuit 79 controls the A-CC circuit 75 to suspend generation of the A-CC driving pulse. The control circuit 79 may have a configuration of suspending generation of the A-CC driving pulse when the control circuit 79 recognizes that the operation of the heater control circuit 73 is suspended, in order to recognize the operation of the heater control circuit 73. That is, if the control circuit 79 operates the heater control circuit 73, and thus discharging of a print medium is started, the control circuit 79 generates the A-CC driving pulse so as to operate the A-CC circuit 75. For example, the control circuit 79 operates the A-CC circuit 75 with a pulse having a frequency of 100 kHz and a pulse period of about 10 µsec. That is, the control circuit 79 supplies pulses of about the sixth power of ten to the A-CC circuit 75 during a period when one print medium is discharged. Thus, it is possible to control the A-CC circuit 75 at a very small resolution.

Next, characteristics of the thermoelectric conversion element 74 will be described.

FIG. 8 is a diagram illustrating an example of the characteristics of the thermoelectric conversion element 74. The graph in FIG. 8 indicates a value of a current which can be taken out, i.e., drawn from, the thermoelectric conversion element 74, with respect to the pulse width, that is, the ON duty cycle of the A-CC driving pulse. The horizontal axis in the graph in FIG. 8 indicates the length of the ON duty cycle of the A-CC driving pulse. The vertical axis in the graph indicates the value of the current which can be taken out from the thermoelectric conversion element 74.

The second PWM pulse generator 85 in the A-CC circuit 75 generates the A-CC driving pulse of a desired amplitude for a selectable duration based on the ON duty cycle designated by the control circuit 79. If the ON duty cycle of the A-CC driving pulse is small, the duration of the pulse is of a first relatively short time period, and the current taken out from the thermoelectric conversion element 74 is small. If the ON duty cycle of the A-CC driving pulse is long, the duration of the pulse is of a second time period, which is longer than that of the relatively short time period, and the current taken out from the thermoelectric conversion element 74 is large. However, the current taken out from the thermoelectric conversion element 74 is determined based on the maximum value of a current which can be taken out in accordance with the temperature difference between the opposed ends of the thermoelectric conversion element 74. Thus, if the current taken out from the thermoelectric conversion element 74 reaches the maximum value, the current taken out from the thermoelectric conversion element 74 is increased no more even if the ON duty cycle of the A-CC driving pulse is increased.

In the example in FIG. 8, when the temperature difference between the opposed ends of the thermoelectric conversion element 74 is 80 degrees C., the maximum value of the current that can be taken out from the thermoelectric conversion element 74 is 0.1 A. When the temperature difference between the opposed ends of the thermoelectric conversion element 74 is 100 degrees C., the maximum value of the current that can be taken out from the thermoelectric conversion element 74 is 0.18 A. When the temperature difference between the opposed ends of the thermoelectric conversion element 74 is 120 degrees C., the maximum value of the current that can be taken out from the thermoelectric conversion element 74 is 0.26 A. That is, the maximum value of the current that can be taken out from the thermoelectric conversion element 74 is increased in proportion to the temperature difference between the opposed ends of the thermoelectric conversion element 74 when this difference is increased.

As described above, because the maximum value of the current, that can, or is to, be taken out depends on the temperature difference between the opposed ends of the thermoelectric conversion element 74 and the frequency of the fluctuation of the temperature difference between the opposed ends of the thermoelectric conversion element 74 is high, the current to be taken out may be decreased or an operation may be unstably performed even though a circuit (constant current circuit) configured to take a constant current out is connected to the thermoelectric conversion element 74. Thus, as illustrated in FIGS. 2 and 5, the A-CC circuit 75 which can adjust the current value of the current taken out from the thermoelectric conversion element 74 is connected to the thermoelectric conversion element 74.

Next, a method of controlling the A-CC circuit 75 by the control circuit 79 will be described.

The control circuit 79 controls the ON duty cycle of the A-CC driving pulse based on a change of the current value (generated power current) detected by the current detection circuit A of the A-CC circuit 75 when the ON duty cycle of the A-CC driving pulse for driving the A-CC circuit 75 is changed. More specifically, the control circuit 79 performs switching at three stages in an order of the duration of the ON duty cycle of the A-CC driving pulse. The control circuit 79 determines whether the ON duty cycle of the A-CC driving pulse should be increased, reduced, or unchanged, based on determination of whether the current of the generated power has increased, not changed, or decreased.

FIGS. 9A to 9C illustrate examples of a change of the generated power current when the ON duty cycle of the A-CC driving pulse is switched. The example will be described on the assumption that a generated power current when the ON duty cycle, i.e., the ON pulse duration, of the A-CC driving pulse is the smallest is the generated power current I1, a generated power current when the ON duty cycle, i.e., the ON pulse duration, of the A-CC driving pulse is the next smallest is the generated power current I2, and a generated power current when the ON duty cycle, i.e., the ON pulse duration, of the A-CC driving pulse is the largest is the generated power current I3.

For example, as illustrated in FIG. 9A, when the generated power current is slowly increased with an increase of the ON duty cycle of the A-CC driving pulse, it is estimated that generated power current which can be taken out from the thermoelectric conversion element 74 yet remains. Thus, when I1<I2<I3 is satisfied (Case 1), the control circuit 79 increases the ON duty cycle, i.e., the ON pulse duration of the A-CC driving pulse.

For example, as illustrated in FIG. 9B, when an increase of the generated power current with the increase of the ON duty cycle of the A-CC driving pulse is stopped in the middle of the increase, it is estimated that generated power current which can be taken out from the thermoelectric conversion element 74 reaches the maximum value. Thus, when I1<I2=I3 is satisfied (Case 2), the control circuit 79 determines that the ON duty cycle of the A-CC driving pulse is adequate, and maintains the ON duty cycle of the A-CC driving pulse.

For example, as illustrated in FIG. 9C, when the generated power current is not changed with the increase of the ON duty cycle of the A-CC driving pulse, it is estimated that generated power current that can be taken out from the thermoelectric conversion element 74 has reached the maximum value and the ON duty cycle is too long. Thus, when I1=I2=I3 is satisfied (Case 3), the control circuit 79 decreases the ON duty cycle of the A-CC driving pulse.

Figure 11:
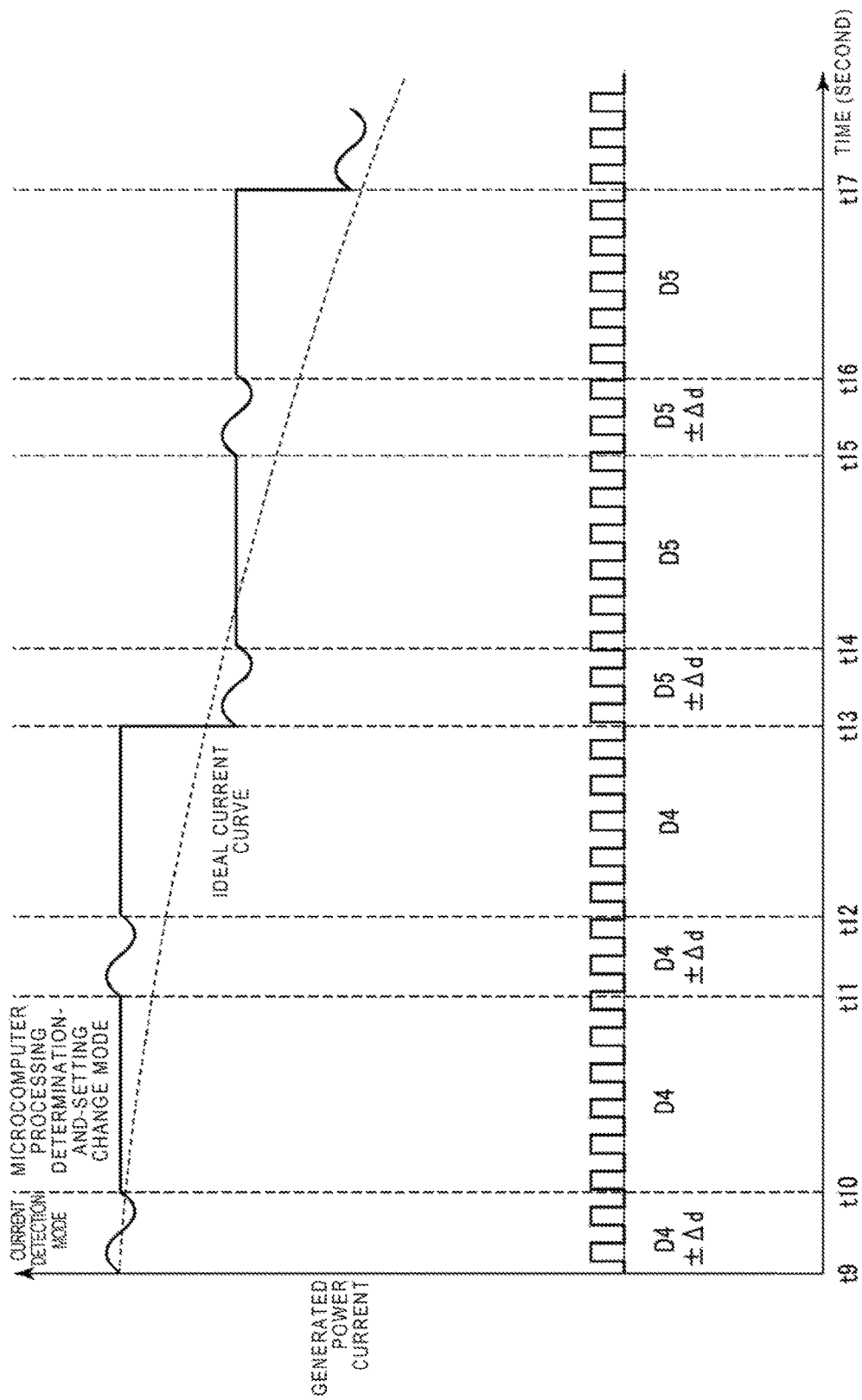
FIG. 11 is a diagram illustrating the relationship between the generated power current and the ON duty cycle.

When the current ON duty cycle is set as D1, the control circuit 79 controls the ON duty cycle of the A-CC driving pulse, for example, by a program as follows.
If (I1<I2 and I2<I3) {A=1;}
Else if(I1<I2 and I2==I3) {A=2:}
Else if(I1==I2 and I2==I3) {A=3;}
Else {A=999;}//error
Case A:
   A=1{D2=D2+d;}
   A=2{D2=D2;}
   A=3{D2=D2−d;}
End case;

FIGS. 10 and 11 are diagrams illustrating a relationship between the generated power current and the ON duty cycle when the A-CC circuit 75 is controlled by the control method of the A-CC circuit 75 illustrated in FIGS. 9A to 9C. FIG. 10 illustrates an example in which the temperature difference between the opposed ends of the thermoelectric conversion element 74 is slowly increased. FIG. 11 illustrates an example in which the temperature difference between the opposed ends of the thermoelectric conversion element 74 is slowly decreased. Horizontal axes in FIGS. 10 and 11 indicate time. Vertical axes in FIGS. 10 and 11 respectively indicate an ideal current curve, the generated power current, and the A-CC driving pulse. The ideal current curve shows characteristics of the temperature difference-generated power current of the thermoelectric conversion element 74. When the horizontal axis is set to be in a (millisecond)ms range, it is not possible to illustrate ON and OFF of the A-CC driving pulse having a frequency of 100 kHz and a period of 10 μS, in the drawings. Thus, in the examples in FIGS. 10 and 11, a coarse pulse is illustrated as the A-CC driving pulse for convenience.

The control circuit 79 acquires the current value of the generated power current while changing the ON duty cycle of the A-CC driving pulse by ±Δd. The control circuit 79 determines whether the ON duty cycle of the A-CC driving pulse has increased, been maintained, or decreased in accordance with any change of the acquired current value, while changing the ON duty cycle of the A-CC driving pulse. A mode in which the control circuit 79 acquires the current value of the generated power current is referred to as "a current detection mode". A mode in which determination of whether the control circuit 79 has increased, maintained, or decreased the ON duty cycle of the A-CC driving pulse is performed, and the ON duty cycle is changed based on the determination result is referred to as "a microcomputer processing determination-and-setting change mode". The control circuit 79 alternately performs "the current detection mode" and "the microcomputer processing determination-and-setting change mode", and thus sequentially changes the ON duty cycle.

For example, the control circuit 79 acquires the current value of the generated power current from the current detection circuit A of the A-CC circuit 75 while changing the ON duty cycle in a range of D1−Δd to D1+Δd, during a period of a time t0 to a time t1. The control circuit 79 determines whether to increase, maintain, or decrease the ON duty cycle during a period of the time t1 to a time t2, based on the acquired current value. The control circuit 79 changes the ON duty cycle based on the determination result, at the time t2. In the example in FIG. 10, the control circuit 79 determines to increase the ON duty cycle during the period of the time t1 to the time t2. The control circuit 79 changes the ON duty cycle from ON duty cycle D1 to ON duty cycle D2 which is greater than the ON duty cycle D1, at the time t2.

Then, the control circuit 79 acquires the current value of the generated power current from the current detection circuit A of the A-CC circuit 75 while changing the ON duty cycle a range of D2−Δd to D2+Δd, during a period of the time t2 to a time t3. The control circuit 79 determines whether to increase, maintain, or decrease the ON duty cycle during a period of time t3 to a time t4, based on the acquired current value. The control circuit 79 changes the ON duty cycle based on the determination result, at the time t4. In the example in FIG. 10, the control circuit 79 determines to maintain the ON duty cycle during the period of the time t3 to the time t4. In this case, the control circuit 79 maintains the ON duty cycle D2 even after the time t4.

Then, the control circuit 79 acquires the current value of the generated power current from the current detection circuit A of the A-CC circuit 75 while changing the ON duty cycle in a range of D2−Δd to D2+Δd, during a period of the time t4 to a time t5. The control circuit 79 determines whether to increase, maintain, or decrease the ON duty cycle during a period of the time t5 to a time t6, based on the acquired current value. The control circuit 79 changes the ON duty based on the determination result, at the timing t6. In the example in FIG. 10, the control circuit 79 determines to increase the ON duty cycle during the period of the time t5 to the time t6. The control circuit 79 changes the ON duty cycle from ON duty cycle D2 to ON duty cycle D3 which is greater than the ON duty cycle D2, at the time t6.

Then, the control circuit 79 acquires the current value of the generated power current from the current detection circuit A of the A-CC circuit 75 while changing the ON duty cycle in a range of D3−Δd to D3+Δd, during a period of the time t6 to a time t7. The control circuit 79 determines whether to increase, maintain, or decrease the ON duty cycle during a period of the time t7 to a time t8, based on the acquired current value. The control circuit 79 changes the ON duty cycle based on the determination result, at the time t8. In the example in FIG. 10, the control circuit 79 determines to increase the ON duty cycle during the period of the time t7 to the timing t8. The control circuit 79 changes the ON duty cycle from ON duty cycle D3 to ON duty cycle D4 which is greater than the ON duty cycle D3, at the time t8.

Next, as illustrated in FIG. 11, an example in which the temperature difference between the opposed ends of the thermoelectric conversion element 74 is slowly decreased will be described.

The control circuit 79 acquires the current value of the generated power current from the current detection circuit A of the A-CC circuit 75 while changing the ON duty cycle in a range of D4−Δd to D4+Δd, during a period of a time t9 to a time t10. The control circuit 79 determines whether to increase, maintain, or decrease the ON duty cycle during a period of the time t10 to a time t11, based on the acquired current value. The control circuit 79 changes the ON duty cycle based on the determination result, at the time t11. In the example in FIG. 11, the control circuit 79 determines to maintain the ON duty cycle during a period of the time t9 to the time t11. In this case, the control circuit 79 maintains the ON duty D4 cycle even after the time t11.

Then, the control circuit 79 acquires the current value of the generated power current from the current detection circuit A of the A-CC circuit 75 while changing the ON duty cycle in a range of D4−Δd to D4+Δd, during a period of the time t11 to a time t12. The control circuit 79 determines whether to increase, maintain, or decrease the ON duty cycle during a period of the time t12 to a time t13, based on the acquired current value. The control circuit 79 changes the ON duty cycle based on the determination result, at the time t13. In the example in FIG. 11, the control circuit 79 determines to decrease the ON duty cycle during the period of the time t12 to the time t13. The control circuit 79 changes the ON duty cycle from ON duty cycle D4 to ON duty cycle D5 which is smaller than the ON duty cycle D4, at the time t13.

Then, the control circuit 79 acquires the current value of the generated power current from the current detection circuit A of the A-CC circuit 75 while changing the ON duty cycle in a range of D5−Δd to D5+Δd, during a period of the time t13 to a time t14. The control circuit 79 determines whether to increase, maintain, or decrease the ON duty cycle during a period of the time t14 to a time t15, based on the acquired current value. The control circuit 79 changes the ON duty cycle based on the determination result, at the time t15. In the example in FIG. 11, the control circuit 79 determines to maintain the ON duty cycle during a period of the time t14 to the time t15. In this case, the control circuit 79 maintains the ON duty cycle D5 even after the time t15.

Then, the control circuit 79 acquires the current value of the generated power current from the current detection circuit A of the A-CC circuit 75 while changing the ON duty cycle in a range of D5−Δd to D5+Δd, during a period of the time t15 to a time t16. The control circuit 79 determines whether to increase, maintain, or decrease the ON duty cycle during a period of the time t16 to a time t17, based on the acquired current value. The control circuit 79 changes the ON duty cycle based on the determination result, at the time t17. In the example in FIG. 11, the control circuit 79 determines to decrease the ON duty cycle during the period of the timing t16 to the timing t17. The control circuit 79 changes the ON duty cycle from ON duty cycle D5 to ON duty cycle D6 which is smaller than the ON duty cycle D5, at the time t17.

With the above processing, the control circuit 79 can control the current value of the generated power current to generally follow the ideal current curve.

Figure 12:
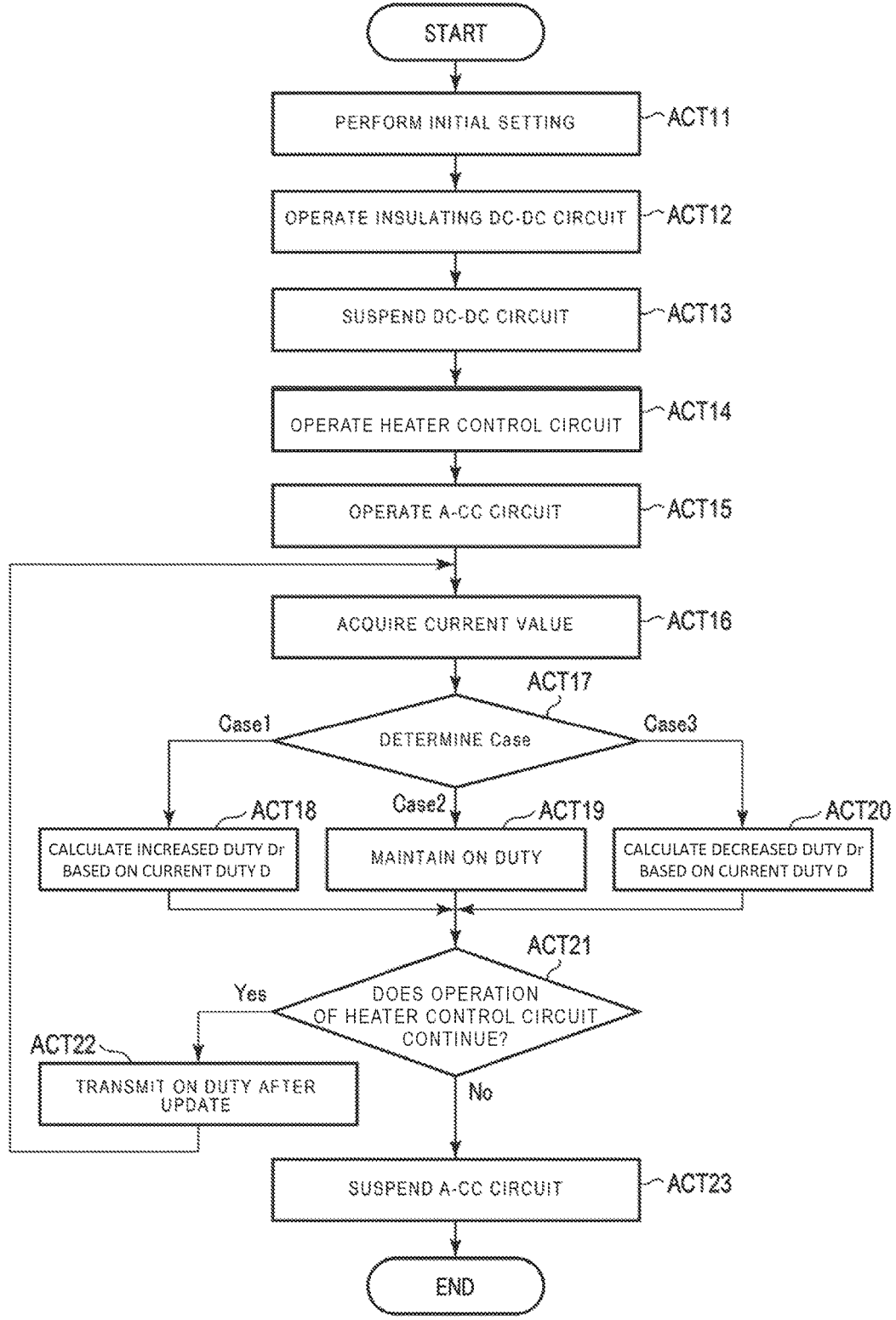
FIG. 12 is a diagram illustrating an example of an operation of a control circuit when electric power is taken out from the thermoelectric conversion element.

Next, the control of the stand-by power supply circuit 20 by the control circuit 79 will be described. FIG. 12 is a diagram illustrating an example of an operation of taking electric power from the thermoelectric conversion element 74.

When image is formed on a print medium, the control circuit 79 performs initial settings of various registers (ACT11).

The control circuit 79 inputs a control signal to the insulating DC-DC circuit 72 so as to operate the insulating DC-DC circuit 72 (ACT12). The control circuit 79 controls the pulse width of the pulse signal which is input to the first switching element SW1 by the first PWM pulse generator 81, and thus holds the output voltage of the insulating DC-DC circuit 72 to be constant.

The control circuit 79 inputs a control signal to the DC-DC circuit 78 so as to suspend an operation of the DC-DC circuit 78 (ACT13). Thus, the control circuit 79 performs a control such that electric power for the stand-by module SB is supplied from the insulating DC-DC circuit 72 and not from the DC-DC circuit 78.

The control circuit 79 inputs a control signal to the heater control circuit 73 so as to operate the heater control circuit 73 (ACT14). The control circuit 79 controls heat generation of the thermal fixing belt BT. Then, the control circuit 79 causes the print medium to be discharged.

The control circuit 79 inputs a control signal to the A-CC circuit 75 so as to operate the A-CC circuit 75 (ACT15). The control circuit 79 designates the ON duty cycle of an initial A-CC driving pulse to the A-CC circuit 75.

The control circuit 79 acquires the current value of the generated power current detected by the current detection circuit A of the A-CC circuit 75, while changing the ON duty cycle of the A-CC driving pulse in the A-CC circuit 75 (ACT16). The control circuit 79 determines whether this corresponds to Case 1, Case 2, or Case 3, based on a change of the acquired current value of the generated power current (ACT17). That is, the control circuit 79 determines whether to increase, maintain, or decrease the ON duty cycle of the A-CC driving pulse.

When the control circuit 79 determines that conditions correspond to Case 1, the control circuit 79 increases the ON duty cycle of the A-CC driving pulse (ACT18). Specifically, the control circuit 79 calculates ON duty cycle after update Dr (Dr=D+Δd), based on the current ON duty D.

When the control circuit 79 determines that conditions correspond to Case 2, the control circuit 79 maintains the ON duty cycle of the A-CC driving pulse (ACT19). Specifically, the control circuit 79 sets the ON duty cycle after the update Dr, to be D.

When the control circuit 79 determines that conditions correspond to Case 3, the control circuit 79 decreases the ON duty cycle of the A-CC driving pulse (ACT20). Specifically, the control circuit 79 calculates ON duty cycle after update Dr (Dr=D−Δd), based on the current ON duty D cycle.

If the control circuit 79 calculates the ON duty cycle after the update Dr, the control circuit 79 determines whether or not to suspend the operation of the heater control circuit 73 (ACT21). For example, when printing on a print medium is ended, the control circuit 79 makes a determination to suspend the operation of the heater control circuit 73.

When the control circuit 79 makes a determination to not suspend the operation of the heater control circuit 73 (YES in ACT21), the control circuit 79 transmits the ON duty cycle after the update Dr to the A-CC circuit 75 (ACT22), and then causes the process to proceed to ACT16. The control circuit 79 repeats the processes of ACT16 to ACT22 during a period until the operation of the heater control circuit 73 is suspended. Thus, the control circuit 79 performs the processing illustrated in FIGS. 10 and 11. As a result, the control circuit 79 can control the current value of the generated power current to follow the ideal current curve.

When the control circuit 79 determines to suspend the operation of the heater control circuit 73 (NO in ACT21), the control circuit 79 suspends the operation of the A-CC circuit 75 (ACT23), and ends the processing.

Figure 13:
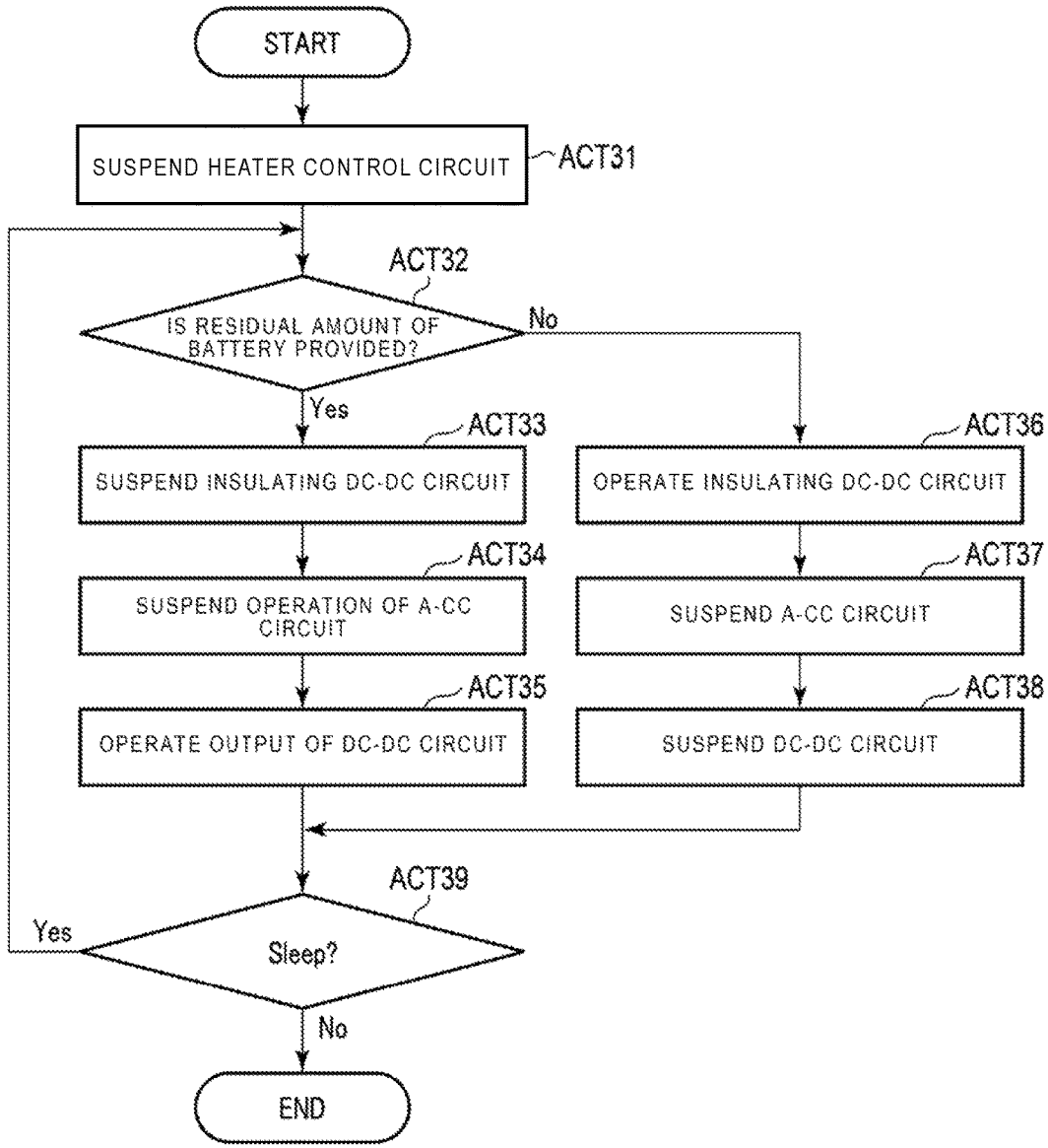
FIG. 13 is a diagram illustrating an example of an operation of the control circuit when the electric power is supplied to a load circuit.

FIG. 13 is a diagram illustrating an example of the operation of the control circuit 79 when electric power is supplied to the stand-by module SB. It is assumed that, for example, a DC voltage of 5 V is supplied to the stand-by module SB. When the image forming apparatus 1 operates, electric power is supplied in the path of the full-wave rectifying circuit 71, the insulating DC-DC circuit 72, and the stand-by module SB from the AC power supply E. At this time, the generated power current by the thermoelectric conversion element 74 is taken out by the A-CC circuit 75 and is stored in the secondary battery 76. If a predetermined time elapses from when image forming on a print medium is completed, the image forming apparatus 1 is put into the sleep mode.

When the image forming apparatus 1 is in the sleep mode, the control circuit 79 suspends the operation of the heater control circuit 73 (ACT31).

The control circuit 79 determines whether or not the residual amount of the electric power in the secondary battery 76 is equal to or greater than a preset threshold, based on the detection result supplied from the residual amount detection circuit 77 (ACT32).

When the control circuit 79 determines that the residual amount of the electric power in the secondary battery 76 is equal to or greater than the preset threshold (YES in ACT32), the control circuit 79 suspends the operation of the insulating DC-DC circuit 72 (ACT33). The control circuit 79 suspends the operation of the A-CC circuit 75 (ACT34). The control circuit 79 operates the DC-DC circuit 78 so as to supply the electric power stored in the secondary battery 76 to the stand-by module SB (ACT35). Then, the process proceeds to ACT39. In this manner, when the residual amount of power remaining in the secondary battery 76 is equal to or greater than the threshold, the stand-by power supply circuit 20 controls the circuits to supply the electric power from the secondary battery 76 to the stand-by module SB.

When the control circuit 79 determines that the residual amount of the electric power in the secondary battery 76 is smaller than the preset threshold (NO in ACT32), the control circuit 79 operates the insulating DC-DC circuit 72 to supply the electric power from the AC power supply E to the stand-by module SB (ACT36). The control circuit 79 suspends the operation of the A-CC circuit 75 (ACT37). The control circuit 79 suspends the operation of the DC-DC circuit 78 (ACT38) and causes the process to proceed to ACT39. In this manner, when the residual amount of power in the secondary battery 76 is smaller than the threshold, the stand-by power supply circuit 20 controls the circuits to supply the electric power from the AC power supply E to the stand-by module SB.

The control circuit 79 determines whether or not the sleep mode continues (ACT39). When the control circuit 79 determines that the sleep mode continues (Yes in ACT36), the control circuit 79 causes the process to proceed to ACT32. Thus, the control circuit 79 switches a power source for supplying the electric power to the stand-by module SB, between the secondary battery 76 and the AC power supply while the residual amount of the secondary battery 76 is continuously monitored. When the control circuit 79 determines that the sleep mode has ended (NO in ACT36), the control circuit 79 ends the processing in FIG. 13.

Figure 14:
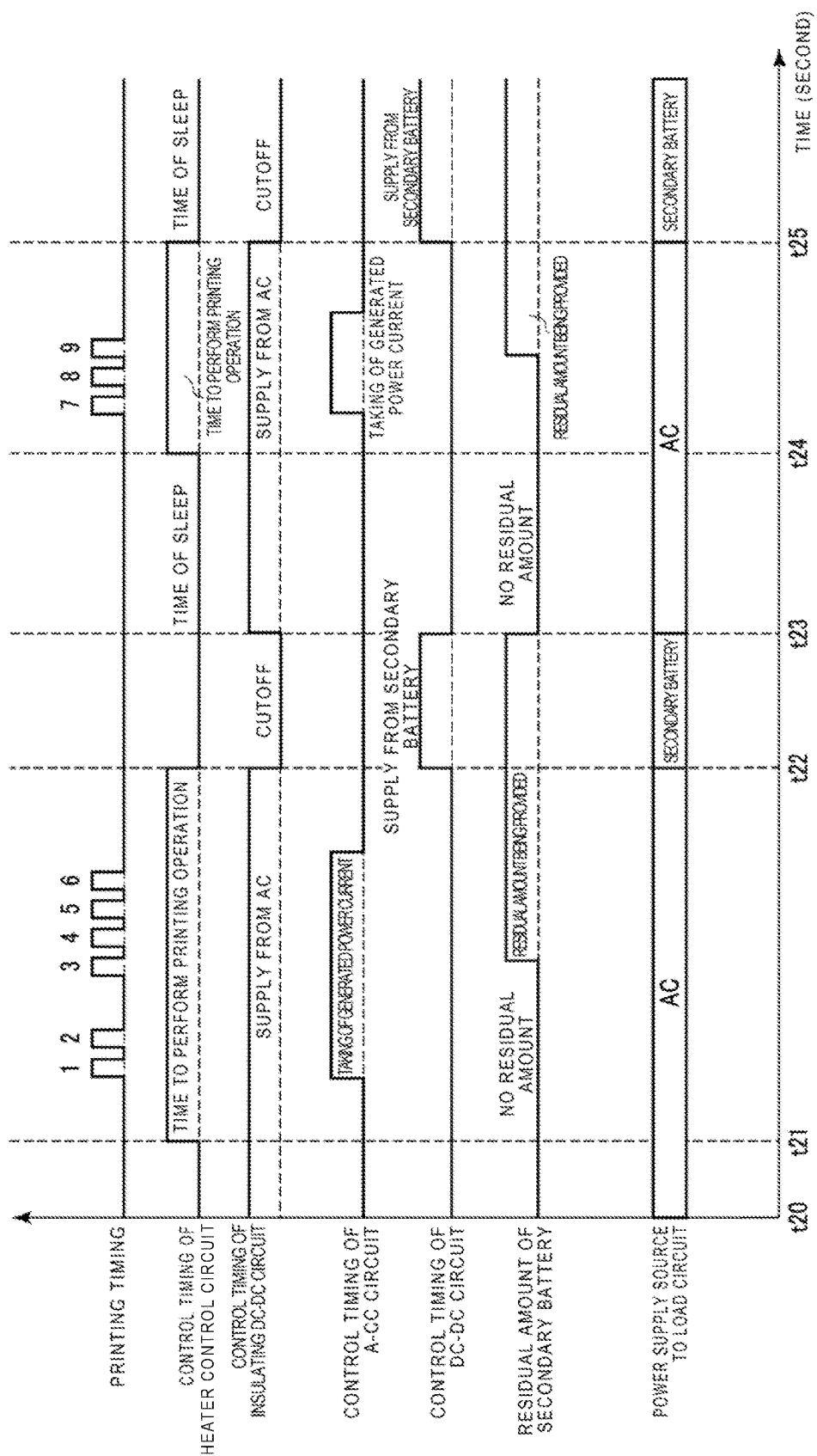
FIG. 14 is a diagram illustrating an operation of each of the circuits in the power supply circuit.

FIG. 14 is a diagram illustrating a control of the units in the power supply circuit. The horizontal axis indicates time. Vertical axes respectively indicate a printing timing by the image forming unit 17, a control timing of the heater control circuit 73, a control timing of the insulating DC-DC circuit 72, a control timing of the A-CC circuit 75, a control timing of the DC-DC circuit 78, a change of the residual amount of charge or power in the secondary battery 76, and a supply source for supplying the electric power to the stand-by module SB.

In this example, it is assumed that printing is not performed in a period from a time t20 to a time t21 and printing is performed on six sheets in a period from the time t21 to a time t22. In addition, it is assumed that printing is not performed in a period from the time t22 to a time t24 and printing is performed on three sheets in a period from the time t24 to a time t25.

The stand-by power supply circuit 20 operates in the sleep mode in the period from the time t20 to the time t21.

If a printing instruction is input, the control circuit 79 starts an operation of the heater control circuit 73 at the time t21 and starts preparation for printing. If the temperature of the thermal fixing belt BT is equal to or higher than a predetermined temperature, printing is performed in the period from the time t21 to the time t22. If the temperature difference in the thermoelectric conversion element 74 is equal to or greater than a predetermined value, the control circuit 79 causes the A-CC circuit 75 to store power generated by the thermoelectric conversion element 74 in the period from the time t21 to the time t22. That is, the control circuit 79 operates the A-CC circuit 75 in accordance with the operation of the heater control circuit 73. If this state continues, electric power is charged into the secondary battery 76, and then electric power charged in the secondary battery 76 becomes equal to or greater than a threshold value. If the printing is completed and generated power is not sufficiently taken from the thermoelectric conversion element 74, the control circuit 79 suspends the operation of the A-CC circuit 75.

The stand-by power supply circuit 20 switches an operation mode of the MFP to the sleep mode from the time t22 when a predetermined time elapses from when the printing is completed. Thus, the control circuit 79 suspends the operation of the heater control circuit 73 and suspends the operation of the insulating DC-DC circuit 72. In the example in FIG. 14, the control circuit 79 operates the DC-DC circuit 78 to cause the residual amount of the electric power in the secondary battery 76 to be equal to or greater than a threshold. Thus, the supply source for supplying electric power to the stand-by module SB is switched from the AC power supply E to the secondary battery 76 at the time t22.

The control circuit 79 sequentially confirms whether or not the residual amount of power in the secondary battery 76 is equal to or greater than the threshold. In the example in FIG. 14, the control circuit 79 determines that the residual amount of power in the secondary battery 76 is smaller than the threshold, at the time t23. In this case, the control circuit 79 starts the operation of the insulating DC-DC circuit 72 and suspends the operation of the DC-DC circuit 78. Thus, the supply source for supplying electric power to the stand-by module SB is switched from the secondary battery 76 to the AC power supply E at the time t23.

If a printing instruction is input again, the control circuit 79 starts the operation of the heater control circuit 73 at the time t24 and starts preparation for printing. If the temperature of the thermal fixing belt BT is equal to or higher than a predetermined temperature, printing is performed in the period from the time t24 to the time t25. If the temperature difference in the thermoelectric conversion element 74 is equal to or greater than a predetermined value, the control circuit 79 causes the A-CC circuit 75 to take power generated by the thermoelectric conversion element 74 during the period from the time t24 to the time t25. Thus, electric power is charged into the secondary battery 76, and then the electric power charged into the secondary battery 76 becomes equal to or greater than the threshold. If the printing is completed and the generated power is not sufficiently taken out from the thermoelectric conversion element 74, the control circuit 79 suspends the operation of the A-CC circuit 75.

The stand-by power supply circuit 20 switches an operation mode of the MFP to the sleep mode from the time t25 when a predetermined time elapses from when the printing is completed. Thus, the control circuit 79 suspends the operation of the heater control circuit 73 and suspends the operation of the insulating DC-DC circuit 72. In the example in FIG. 14, the control circuit 79 operates the DC-DC circuit 78 to cause the residual amount of the electric power in the secondary battery 76 to be equal to or greater than a threshold, i.e., the secondary battery is charged. Thus, the supply source for supplying electric power to the stand-by module SB is switched from the AC power supply E to the secondary battery 76 again at the time t25.

According to the stand-by power supply circuit 20 configured as described above, the thermoelectric conversion element 74 generates electric power from the heat of a paper and toner heated by the thermal fixing unit F when printing is performed. The power generated using the heat of the thermoelectric conversion element 74 is taken out by the A-CC circuit 75. Thus, the stand-by power supply circuit 20 can supply electric power generated by heat to the stand-by module SB. The control circuit 79 of the stand-by power supply circuit 20 controls the A-CC circuit 75 that takes current out from the thermoelectric conversion element 74, based on the change of the current taken out from the thermoelectric conversion element 74. That is, the control circuit 79 controls the target value of the constant current taken out by the A-CC circuit 75, based on the change of the value of the current flowing from the thermoelectric conversion element 74 into the A-CC circuit 75 when the control circuit 79 controls the A-CC circuit 75 so as to change the target value of the constant current to be taken out from the thermoelectric conversion element 74. Thus, the stand-by power supply circuit 20 can take electric power out from the thermoelectric conversion element 74 with high efficiency.

The A-CC circuit 75 includes the second inductor L2 which is connected in series to the thermoelectric conversion element 74, the fourth switching element SW4 which is connected in series to the thermoelectric conversion element 74, and the current detection circuit A which is connected in series to the thermoelectric conversion element 74 and detects the current value of the current flowing from the thermoelectric conversion element 74 into the A-CC circuit 75. The A-CC circuit 75 includes the fifth switching element SW5 and the fifth capacitor C5 which are connected in series at a portion between the connection point of the second inductor L2 and the fourth switching element SW4 and the other terminal of the fourth switching element SW4. Further, the A-CC circuit 75 includes the second PWM pulse generator 85 and the first synchronous rectification pulse generator 86 which are driver circuits configured to input pulse signals for causing the fourth switching element SW4 and the fifth switching element SW5 to turn ON and OFF, to the fourth switching element SW4 and the fifth switching element SW5, respectively. In this configuration, the control circuit 79 maintains the current ON state when the current value detected by the current detection circuit A is decreased with the decrease of the ON duty cycle of the pulse signal and the current value detected by the current detection circuit A is not changed with the increase of the ON duty cycle of the pulse signal. When the current value detected by the current detection circuit A is decreased with the decrease of the ON duty cycle of the pulse signal and the current value detected by the current detection circuit A is increased with the increase of the ON duty cycle of the pulse signal, the control circuit 79 increases the ON duty cycle. When the current value detected by the current detection circuit A is not changed with the decrease of the ON duty cycle of the pulse signal and the current value detected by the current detection circuit A is not changed with the increase of the ON duty cycle of the pulse signal, the control circuit 79 decreases the ON duty cycle. Thus, the stand-by power supply circuit 20 can take electric power out from the thermoelectric conversion element 74 along the ideal current curve determined by the characteristics and the temperature of the thermoelectric conversion element 74.

If electric power generated by heat is consumed by the stand-by module SB, the stand-by power supply circuit 20 switches the supply source of the electric power so as to supply electric power to the stand-by module SB from the AC power supply E. Thus, the stand-by power supply circuit 20 can use the electric power of the secondary battery 76 when electric power remains in the secondary battery 76, and can use electric power from the AC power supply E when electric power does not remain in the secondary battery 76. Thus, in the stand-by power supply circuit 20, it is possible to improve efficiency of electric power consumption.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power supply circuit comprising:
   a thermoelectric conversion element configured to generate electric power when the thermoelectric conversion element is differentially heated;
   an adjustable current circuit configured to draw a current from the thermoelectric conversion element and resultantly output a constant current having a target current level over a period of time;
   a voltage conversion circuit configured to output a voltage based on the constant current output by the adjustable current circuit; and
   a control circuit configured to control the adjustable current circuit to change the target current level based on a change in the current drawn from the thermoelectric conversion element after passage of the period of time.

2. The power supply circuit according to claim 1, wherein the adjustable current circuit includes:
   an inductor connected to the thermoelectric conversion element in series;
   a first switching element connected to the inductor in series;
   a current detection circuit connected to the inductor in series and configured to detect a current level of the current from the thermoelectric conversion element;
   a second switching element connected in series between a connection point of the inductor and the first switching element and another terminal of the first switching element;
   a capacitor having one end connected to the first switching element and the other end connected to the second switching element; and
   a driver circuit configured to output pulse signals to the first switching element and the second switching element, the pulse signals causing one of the first switching element and the second switching element to turn ON and the other of the first switching element and the second switching element to turn OFF.

3. The power supply circuit of claim 2, wherein the pulse signal supplied to the first switching element has a first portion and a second portion, and a duration of time during which the first and second portions are present in a pulse is adjustable by the driver circuit.

4. The power supply circuit of claim 3, wherein the control circuit is configured to control the driver circuit to change pulse durations of the first and second portions in the pulse signal supplied to the first switching element based on a current level of a current passing through the first switching element.

5. The power supply of claim 4, wherein the current detection circuit detects the current level of the current passing through the first switching element.

6. The power supply circuit of claim 5, wherein the control circuit is further configured to generate and transmit a control signal to the driver circuit to:
   vary the duration of the pulse durations of the first and second portions, during a first time period, in the pulse signal supplied to the first switching element; and
   in response to the detected current passing through the first switching element in the first time period, in a second time period after the first time period, increase the duration of the first portion of the pulse if the detected current passing through the first switching element increases, maintain the duration of the first portion of the pulse if the detected current passing through the first switching element does not increase or decrease, and reduce the duration of the first portion of the pulse if the detected current passing through the first switching element decreases.

7. The power supply circuit according to claim 1, further comprising:
   a battery connected to the output of the adjustable current circuit;
   an AC power supply;
   a load circuit;

a first converter configured to connect the AC power supply to a load circuit; and
a second converter configured to connect the battery to the load circuit,
wherein the control circuit is further configured to;
operate the first converter to supply electric power from the AC power supply to the load circuit and operate the second converter to suspend the supplying of electric power from the battery to the load circuit when an amount of electric power in the secondary battery is smaller than a preset threshold; and
operate the first converter to suspend the supplying of the electric power from the AC power supply to the load circuit and operate the second converter to supply the electric power from the battery to the load circuit when the amount of the electric power in the secondary battery is greater than or equal to the preset threshold.

8. An image forming apparatus comprising:
an image forming unit configured to fix a toner image on a print medium using heat supplied thereto by a thermal fixing load; and
a power supply circuit configured to supply electric power to the thermal fixing load, the power supply circuit comprising:
a thermoelectric conversion element configured to generate electric power when the thermoelectric conversion element is differentially heated,
an adjustable current circuit configured to draw a current from the thermoelectric conversion element and resultantly output a constant current having a target current level over a period of time,
a voltage conversion circuit configured to output a voltage based on the constant current output by the adjustable current circuit, and
a control circuit configured to control the adjustable current circuit to change the target current level based on a change in the current drawn from the thermoelectric conversion element after passage of the period of time.

9. The image forming apparatus according to claim 8, wherein the adjustable current circuit includes:
an inductor connected to the thermoelectric conversion element in series;
a first switching element connected to the inductor in series;
a current detection circuit connected to the inductor in series and configured to detect a current level of the current from the thermoelectric conversion element;
a second switching element connected in series between a connection point of the inductor and the first switching element and another terminal of the first switching element;
a capacitor having one end connected to the first switching element and the other end connected to the second switching element; and
a driver circuit configured to output pulse signals to the first switching element and the second switching element, the pulse signals causing one of the first switching element and the second switching element to turn ON and the other of the first switching element and the second switching element to turn OFF.

10. The image forming apparatus according to claim 9, wherein the pulse signal supplied to the first switching element has a first portion and a second portion, and a duration of time during which the first and second portions are present in a pulse is adjustable by the driver circuit.

11. The image forming apparatus according to claim 10, wherein the control circuit is configured to control the driver circuit to change pulse durations of the first and second portions in the pulse signal supplied to the first switching element based on a current level of a current passing through the first switching element.

12. The image forming apparatus according to claim 11, wherein the current detection circuit detects the current level of the current passing through the first switching element.

13. The image forming apparatus according to claim 12, wherein the control circuit is further configured to generate and transmit a control signal to the driver circuit to:
vary the duration of the pulse durations of the first and second portions, during a first time period, in the pulse signal supplied to the first switching element; and
in response to the detected current passing through the first switching element in the first time period, in a second time period after the first time period, increase the duration of the first portion of the pulse if the detected current passing through the first switching element increases, maintain the duration of the first portion of the pulse if the detected current passing through the first switching element does not increase or decrease, and reduce the duration of the first portion of the pulse if the detected current passing through the first switching element decreases.

14. The image forming apparatus according to claim 8, wherein the power supply circuit further comprises:
a battery connected to the output of the adjustable current circuit;
an AC power supply;
a load circuit;
a first converter configured to connect the AC power supply to a load circuit; and
a second converter configured to connect the battery to the load circuit,
wherein the control circuit is further configured to;
operate the first converter to supply electric power from the AC power supply to the load circuit and operate the second converter to suspend the supplying of electric power from the battery to the load circuit when an amount of electric power in the secondary battery is smaller than a preset threshold; and
operate the first converter to suspend the supplying of the electric power from the AC power supply to the load circuit and operate the second converter to supply the electric power from the battery to the load circuit when the amount of the electric power in the secondary battery is greater than or equal to the preset threshold.

* * * * *